United States Patent
Kuba

(10) Patent No.: US 9,934,114 B2
(45) Date of Patent: Apr. 3, 2018

(54) COMMUNICATION SYSTEM, STANDBY DEVICE, COMMUNICATION METHOD, AND STANDBY PROGRAM

(71) Applicant: Mitsubishi Electric Corporation, Tokyo (JP)

(72) Inventor: Ryohei Kuba, Tokyo (JP)

(73) Assignee: Mistubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/023,106

(22) PCT Filed: Sep. 26, 2013

(86) PCT No.: PCT/JP2013/076072
§ 371 (c)(1),
(2) Date: Mar. 18, 2016

(87) PCT Pub. No.: WO2015/045062
PCT Pub. Date: Apr. 2, 2015

(65) Prior Publication Data
US 2016/0224443 A1 Aug. 4, 2016

(51) Int. Cl.
*G06F 11/00* (2006.01)
*G06F 11/20* (2006.01)
(Continued)

(52) U.S. Cl.
CPC ........ *G06F 11/2033* (2013.01); *G06F 13/385* (2013.01); *H04L 67/12* (2013.01); *G06F 2201/805* (2013.01)

(58) Field of Classification Search
CPC .................................................. G06F 11/2033
See application file for complete search history.

(56) References Cited

U.S. PATENT DOCUMENTS 7,100,070 B2    8/2006    Iwamura et al.
7,305,578 B2    12/2007    Baba et al.
(Continued)

FOREIGN PATENT DOCUMENTS

CN    100452797 C    1/2009
CN    101262479 B    3/2012
(Continued)

OTHER PUBLICATIONS

Microsoft Computer Dictionary, Microsoft Press, 1999, p. 65.*
(Continued)

*Primary Examiner* — Christopher McCarthy
(74) *Attorney, Agent, or Firm* — Sughrue Mion, PLLC; Richard C. Turner

(57) ABSTRACT

Down-time at switching of systems is reduced in a communication system that implements functional safety communication. Provided are a first preparation part 1222 that, when a functional safety communication initialization sequence is started between a slave and a control-system master, executes a first sequence group consisting of some sequences of the functional safety communication initialization sequence together with the slave; a second preparation part 1223 that executes a second sequence group being a sequence of the functional safety communication initialization sequence other than the first sequence group together with the slave when a failure of the control-system master is detected after execution of the first sequence group is completed; and a control communication control part 110 that starts control communication with the slave after execution of the second sequence group is completed.

11 Claims, 17 Drawing Sheets

(51) Int. Cl.
*G06F 13/38* (2006.01)
*H04L 29/08* (2006.01)

(56) References Cited

U.S. PATENT DOCUMENTS

| | | | |
|---|---|---|---|
| 8,893,132 | B2 | 11/2014 | Okano |
| 2005/0198327 | A1 | 9/2005 | Iwamura et al. |
| 2005/0198552 | A1 | 9/2005 | Baba et al. |
| 2009/0254911 | A1 | 10/2009 | Okano |
| 2012/0246510 | A1 | 9/2012 | Kojina |
| 2014/0336794 | A1 | 11/2014 | Eto et al. |

FOREIGN PATENT DOCUMENTS

| | | |
|---|---|---|
| JP | 07-219799 A | 8/1995 |
| JP | 08-221287 A | 8/1996 |
| JP | 2005-242404 A | 9/2005 |
| JP | 2005-250626 A | 9/2005 |
| JP | 2009-140277 A | 6/2009 |
| JP | 2009-205364 A | 9/2009 |
| JP | 2010-009293 A | 1/2010 |
| JP | 2011-048678 A | 3/2011 |
| WO | 2013111240 A1 | 8/2013 |

OTHER PUBLICATIONS

Communication dated Dec. 2, 2016, issued by the German Patent Office in corresponding German Application No. 112013007469.9.
Machine Translation of JP 2010-009293 A, published Jan. 14, 2010.
Taiwanese Office Action of Application No. 10421451420 dated Oct. 27, 2015.
International Search Report of PCT/JP2013/076072 dated Dec. 24, 2013.
Taiwanese Office Action of Application No. 102138393 dated Oct. 27, 2015.
Communication dated Jan. 4, 2017, from the State Intellectual Property Office of People's Republic of China in counterpart Application No. 201380079875.9.

* cited by examiner

131: EXISTENCE INFORMATION FRAME
1311 DESTINATION: SLAVE STATION
1312 CONTENT: TRANSMISSION TIME

COMMUNICATION SYSTEM, STANDBY DEVICE, COMMUNICATION METHOD, AND STANDBY PROGRAM

CROSS REFERENCE TO RELATED APPLICATIONS

This application is a National Stage of International Application No. PCT/JP2013/076072 filed Sep. 26, 2013, the contents of which are incorporated herein by reference in their entirety.

TECHNICAL FIELD

The prevent invention relates to a communication system, a standby device, a communication method, and a standby program, and relates in particular to a communication system, a standby device, a communication method, and a standby program that employ a system-switching method.

BACKGROUND ART

There is a network system that employs a master-slave method for the field of instrumentation. FIG. 1 is a diagram illustrating an example of the configuration of the network system that employs the master-slave method (system-switching system 500).

The network system illustrated in FIG. 1 is composed of two masters 100 (control-system master 100a, standby-system master 100b) and a plurality of slaves 200 (slave 1 (200 1), ..., slave n (200 n)) in order to maintain availability. Maintaining availability means to shorten the time during which the system is halted as much as possible.

By providing the duplicated masters 100 as described above, the standby-system master 100b can take over the role even if a malfunction occurs in the control-system master 100a, and availability can be maintained.

In order to maintain availability, it is necessary not only to provide the duplicated masters 100 but also to reduce down-time which occurs when the role of the control-system master 100a and the role of the standby-system master 100b are switched.

The down-time is the time during which a system or service is halted, and refers herein to the time from when a malfunction occurs in the control-system master 100a to when communication is resumed between the standby-system master 100b and the slave 200.

As an example of a technique for reducing the down-time, Patent Literature 1 is presented. Patent Literature 1 reduces the start-up time of an execution on-line system of a standby computing machine when a failure occurs in an execution computing machine. A system of Patent Literature 1 is composed of one execution computing machine and one standby computing machine. An execution on-line system is incorporated in the execution computing machine. A dummy on-line system is incorporated in the standby computing machine. A switching monitor program is incorporated in each of the execution computing machine and the standby computing machine.

The operation of the system of Patent Literature 1 is as described below. First, the execution computing machine operates at normal times. At this time, the dummy on-line system that is identical with the on-line system of the execution computing machine is launched on a memory in the standby computing machine. Thereafter, the dummy on-line system is executed on the standby computing machine until switching of the systems occurs.

When a failure occurs in the execution computing machine, switching of the systems occurs and the processing of the execution computing machine is taken over by the standby computing machine. In the standby computing machine, the identical dummy on-line system has already been started, so that the processing can be continued without initializing the memory, and the down-time can be reduced.

CITATION LIST

Patent Literature

Patent Literature 1: JP 08-221287 A

SUMMARY OF INVENTION

Technical Problem

Recently, in the network system as illustrated in FIG. 1, it is required that functional safety communication based on connection-type communication be applied to a network part of the system with a view to enhancing safety of the system. The functional safety communication refers to communication that satisfies the following conditions (a) to (d) in order to transmit a command reliably without error.
(a) Measures are taken against communication errors, such as an unintended repeat, incorrect sequence, loss, unacceptable delay, masquerading, addressing, and so on.
(b) CRC (Cyclic Redundancy Check) is added to a control communication packet so that data corruption during transmission can be detected.
(c) A processing part which is dedicated to the functional safety communication (safety communication layer) is provided.
(d) Before communication is started, a functional safety communication initialization sequence described below is executed for each connection for implementing the functional safety communication.

<Functional Safety Communication Initialization Sequence>
[1] A safety connection establishment request and a response.
[2] A network parameter check request and a response, and retention of a parameter.
[3] A safety station parameter verification request and a response, and a parameter validity check.
[4] If an optional function is required, a frame related to the optional function is exchanged.
[5] A refresh preparation and offset measurement request and a response.
[6] Based on offset measurement information of [5], a safety refresh and offset generation request and a response are executed.

When the functional safety communication is executed in the network system as illustrated in FIG. 1, there is a problem that switching of the systems takes time because it is necessary to execute the above-described functional safety communication initialization sequence before communication is started.

The technique for reducing the down-time disclosed in Patent Literature 1 does not assume a case of applying the functional safety communication based on connection-type communication which requires initialization of communication.

FIG. 2 is a communication sequence diagram in a case where the functional safety communication is applied to the network system of FIG. 1. In FIG. 2, an arrow indicates exchanging of data.

As illustrated in FIG. 2, at setup of the network system, the functional safety communication initialization sequence [1] to [6] is executed between the control-system master 100a and the slave 200 and between the control-system master 100a and the standby-system master 100b.

When a failure occurs in the control-system master 100a and switching of the systems occurs, the functional safety communication initialization sequence [1] to [6] is executed between the standby-system master 100b and the slave 200 before regular communication is started between the standby-system master 100b and the slave 200. For this reason, there is a problem of the prolonged down-time from when a malfunction occurs in the control-system master 100a and switching of the systems occurs until when communication is resumed between the standby-system master 100b and the slave 200.

It is an object of the present invention to reduce down-time in a network system that employs functional safety communication when the functional safety communication is implemented at switching of systems.

Solution to Problem

A communication system according to the present invention includes a computing machine, a control device to control the computing machine, and a standby device to replace the control device when a failure occurs in the control device. The control device includes a control-side preparation part to execute a preparation sequence group including a plurality of sequences together with the computing machine, and a control-side communication part to start control communication for controlling the computing machine with the computing machine after execution of the preparation sequence group is completed by the control-side preparation part. The standby device includes a first preparation part to execute a first sequence group being one or some of the plurality of sequences included in the preparation sequence group together with the computing machine when the preparation sequence group is started between the control device and the computing machine by the control-side preparation part, a second preparation part to execute a second sequence group consisting of a sequence of the preparation sequence group other than the first sequence group together with the computing machine when a failure of the control device is detected after execution of the first sequence group is completed by the first preparation part, and a standby-side communication part to start the control communication with the computing machine after execution of the second sequence group is completed by the second preparation part.

Advantageous Effects of Invention

According to a communication system according to the present invention, a standby device includes a first preparation part that, when a preparation sequence is started between a control device and a computing machine, executes a first sequence group consisting of some sequences of the preparation sequence together with the computing machine; a second preparation part that executes a second sequence group being a sequence of the preparation sequence other than the first sequence group together with the computing machine when a failure of the control device is detected after execution of the first sequence group is completed; and a standby-side communication part that starts control communication with the computing machine after execution of the second sequence group is completed.

Thus, a preparation sequence group to be executed between the standby device and the computing machine at switching of systems can be shortened, and down-time can be reduced.

DESCRIPTION OF EMBODIMENTS

First Embodiment

Figure 1:
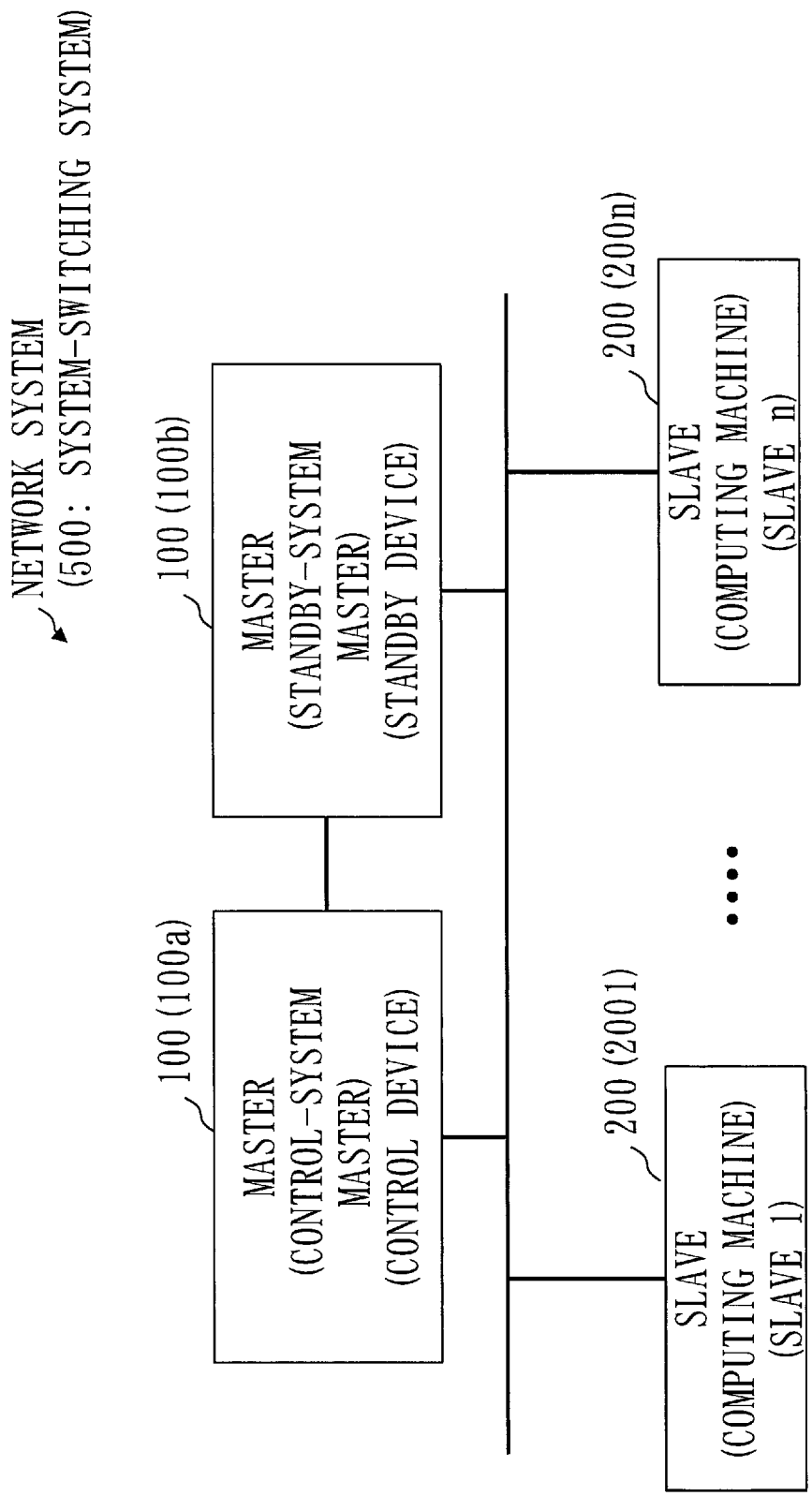
FIG. 1 is a diagram illustrating an example of the configuration of a network system that employs a master-slave method (system-switching system 500)
Figure 2:
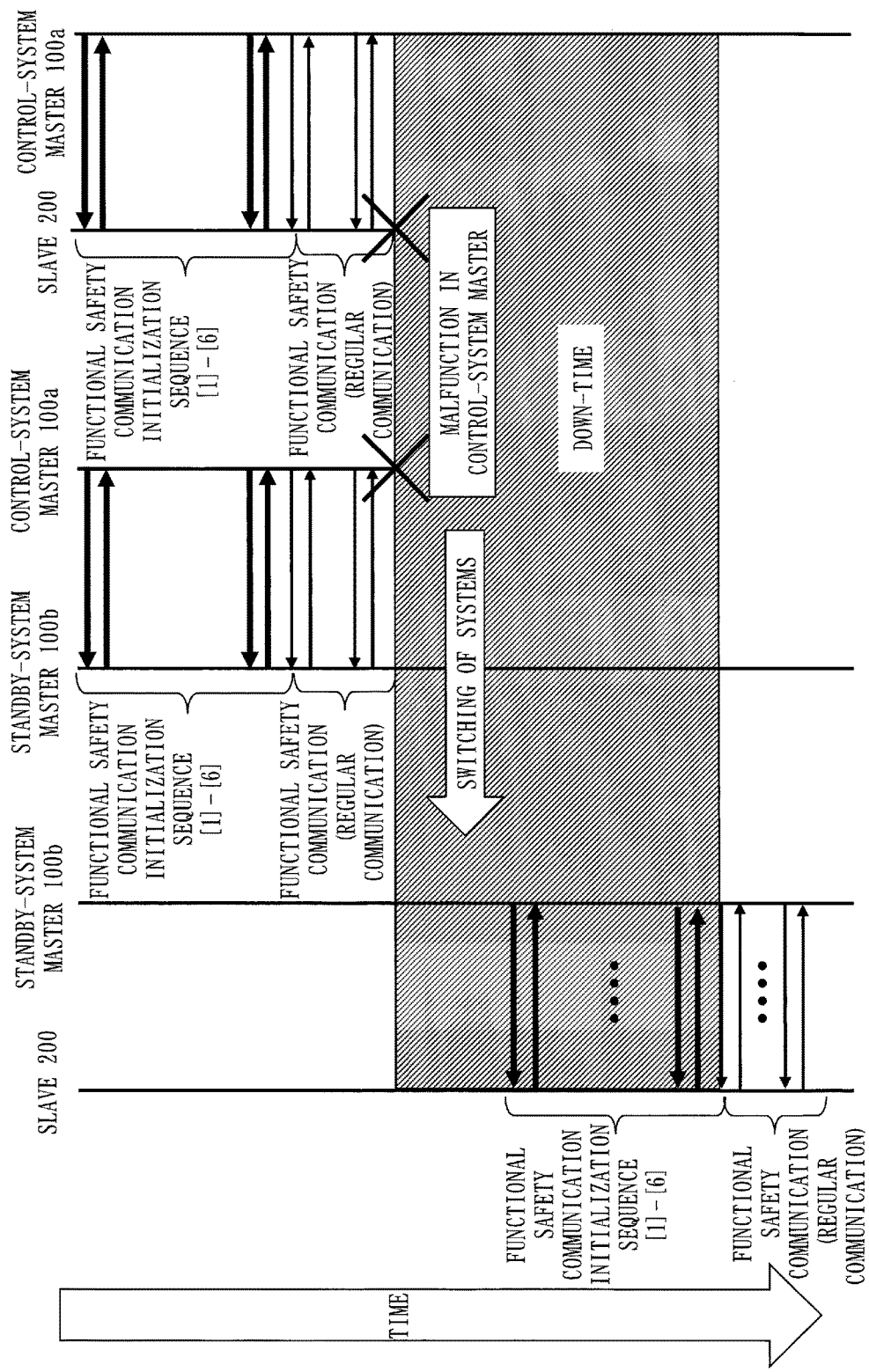
FIG. 2 is a communication sequence diagram in a case where functional safety communication is applied to the network system of FIG. 1.

FIG. 1 is a diagram illustrating an example of the configuration of a network system that employs a master-slave method (system-switching system 500). This embodiment describes a method by which down-time at switching of systems can be reduced in a case where functional safety communication is applied to the system-switching system 500 (an example of a communication system) illustrated in FIG. 1.

A control-system master 100*a* and a standby-system master 100*b* are connected by a dedicated line. A plurality of slaves 200 (slave 1 (2001) to slave n (200*n*)) are line-connected to the control-system master 100*a* and the standby-system master 100*b* by a transmission line.

The control-system master 100*a* (control device) performs control communication with the slave 200 (computing machine) and thereby controls the slave 200. The standby-system master 100*b* (standby device) replaces the control-system master 100*a* when a failure occurs in the control-system master 100*a*. It is desirable that the control-system master 100*a* and the standby-system master 100*b* have the same configuration.

Figure 3:
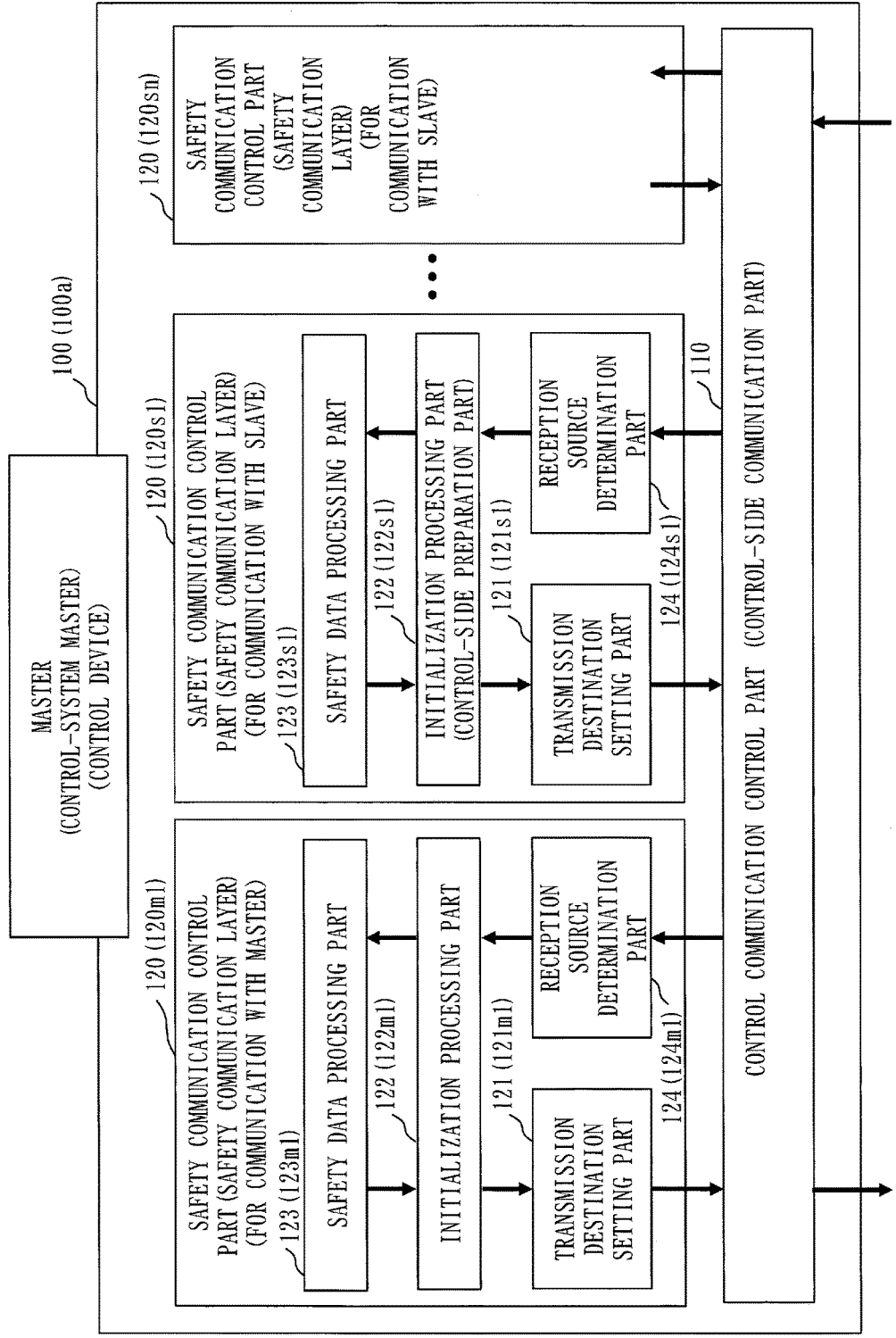
FIG. 3 is a diagram illustrating an example of the block configuration of a master 100 (control-system master 100a) according to a first embodiment.
Figure 4:
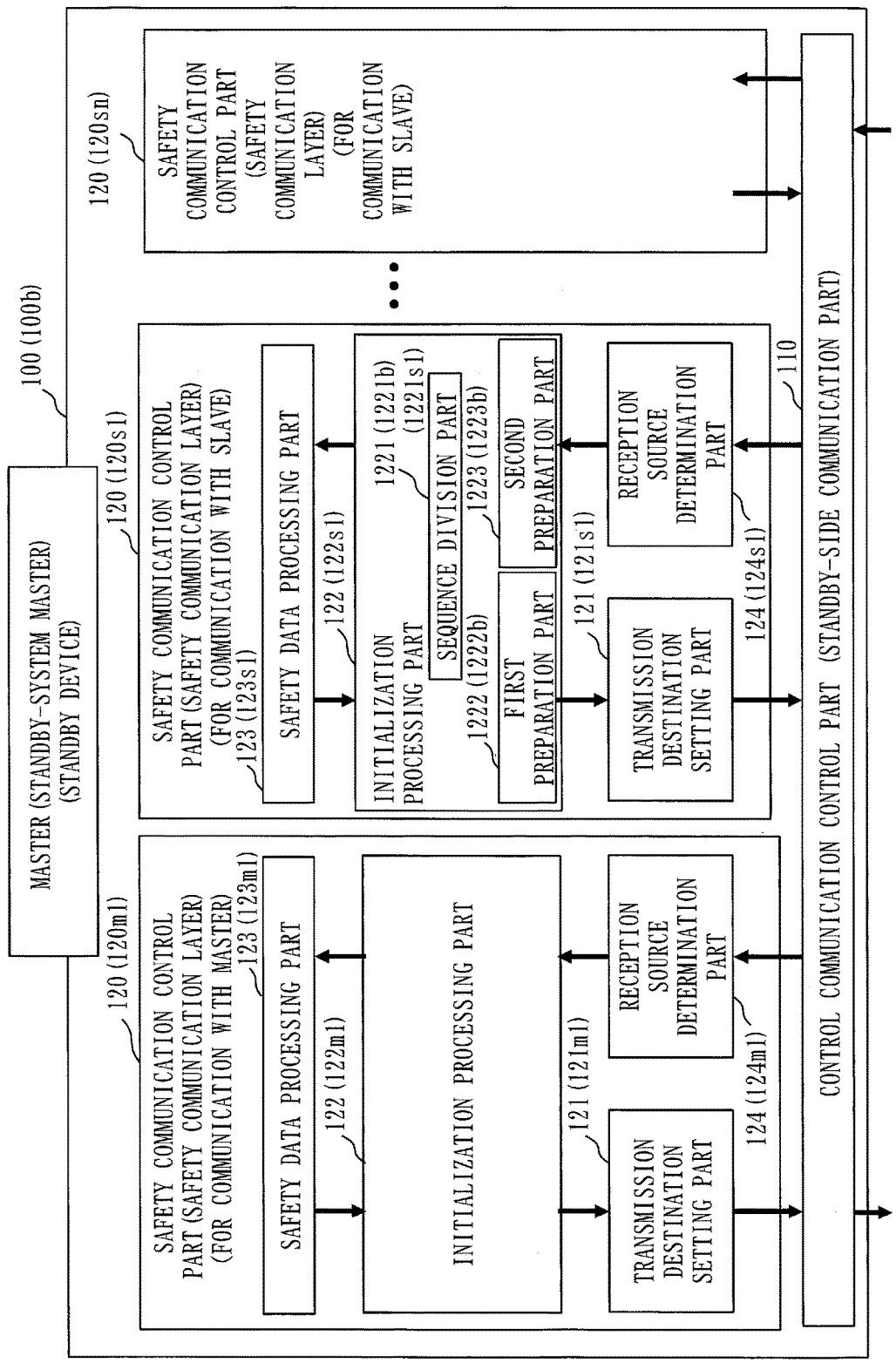
FIG. 4 is a diagram illustrating an example of the block configuration of a master 100 (standby-system master 100b) according to the first embodiment.

FIG. 3 is a diagram illustrating an example of the block configuration of the master 100 (control-system master 100*a*) according to this embodiment. FIG. 4 is a diagram illustrating an example of the block configuration of the master 100 (standby-system master 100*b*) according to this embodiment.

With reference to FIG. 3 and FIG. 4, the block configuration of the control-system master 100*a* and the block configuration of the standby-system master 100*b* will be described.

As illustrated in FIG. 3 and FIG. 4, the control-system master 100*a* and the standby-system master 100*b* have the same configuration. Thus, the configuration will be described as the configuration of the master 100 herein.

In the following description, when one of suffixes m1 to m5 and s1 to sn is appended to a component part, the component part is included in a safety communication control part 120 having the same suffix. When one of suffixes a and b is appended to a component part, the component part is included in the master 100 (control-system master 100*a* or standby-system master 100*b*) having the same suffix.

The master 100 includes a control communication control part 110 and the safety communication control part 120.

The control communication control part 110 controls transmission and reception of a frame required for the control communication. The control communication is communication which is performed between the master 100 and the slave 200 for transmitting, to the slave 200, a command for causing the slave 200 to operate.

A control communication control part 110*a* of the control-system master 100*a* is an example of a control-side communication part that starts the control communication with the slave 200 after execution of a functional safety communication initialization sequence is completed. A control communication control part 110*b* of the standby-system master 100*b* is an example of a standby-side communication part that starts the control communication with the slave 200 after execution of a second sequence group (see FIG. 10) out of the functional safety communication initialization sequence is completed.

The safety communication control part 120 controls transmission and reception of a frame required for the functional safety communication (to be also referred to as a safety frame). The safety communication control part 120 executes the functionality of a safety communication layer that performs a communication error check for implementing the functional safety communication with the other master 100 and the plurality of the slaves 200 connected to the own master 100.

The safety communication control part 120 is provided for each of the other master 100 and the plurality of the slaves 200. The safety communication control part 120 for implementing the functional safety communication with the other master 100 will be described as a safety communication control part 120*m*1. The safety communication control parts 120 for implementing the functional safety communication with the slave 1 to the slave n will be described as safety communication control parts 120*s*1 to 120*sn* (n denotes the number of slaves), respectively.

The safety communication control part 120 includes a reception source determination part 124, a transmission destination setting part 121, an initialization processing part 122, and a safety data processing part 123.

The reception source determination part 124 obtains a safety frame transmitted to the safety communication control part 120, and determines a reception source of the safety frame. The safety frame is a frame in which information required by the safety communication control part 120 for performing a communication error check is stored.

The transmission destination setting part 121 sets a transmission destination in the safety frame.

The initialization processing part 122 executes the functional safety communication initialization sequence.

The functional safety communication initialization sequence is an example of a preparation sequence group which is executed before the control communication is started. The functional safety communication initialization sequence (preparation sequence group) includes a plurality of sequences [1] to [6].

The initialization processing part 122 receives a parameter which is included in the safety frame and which is used in the functional safety communication initialization sequence, and executes the functional safety communication initialization sequence.

As illustrated in FIG. 3, when the master 100 is the control-system master 100*a*, an initialization processing part 122*a* is an example of a control-side preparation part that executes the functional safety communication initialization sequence with the slave 200.

As illustrated in FIG. 4, when the master 100 is the standby-system master 100*b*, an initialization processing part 122*b* includes a sequence division part 1221, a first preparation part 1222, and a second preparation part 1223.

Note that every initialization processing part 122 may include the sequence division part 1221, the first preparation part 1222, and the second preparation part 1223, or only the initialization processing part 122*b* of the standby-system master 100*b* may include the sequence division part 1221, the first preparation part 1222, and the second preparation part 1223. However, it is desirable that the control-system master 100*a* and the standby-system master 100*b* have the same configuration because each can be backed up by the other.

The sequence division part 1221 divides the functional safety communication initialization sequence into a first sequence group and a second sequence group based on the content of each sequence included in the functional safety communication initialization sequence. The sequence division part 1221 divides the functional safety communication initialization sequence into the first sequence group and the second sequence group at setup of the system-switching system 500.

When the functional safety communication initialization sequence is started between the control-system master 100*a* and the slave 200, the first preparation part 1222 executes the first sequence group being some sequences of the plurality of sequences included in the functional safety communication initialization sequence together with the slave 200.

When a failure of the control-system master 100*a* is detected after execution of the first sequence group is completed, the second preparation part executes the second sequence group consisting of sequences of the functional safety communication initialization sequence other than the first sequence group together with the slave 200.

In this embodiment, the sequence division part 1221 divides the functional safety communication initialization sequence into the first sequence group and the second sequence group, and then the first preparation part 1222 executes the first sequence group. However, this is not limiting. The first sequence group and the second sequence group may be divided by a system administrator or the like and stored in a storage device included in the master 100 in advance.

In this embodiment, the sequence division part 1221, the first preparation part 1222, and the second preparation part 1223 are newly added to the safety communication control part 120.

The safety data processing part 123 performs processing of safety data required for measures against a communication error in the functional safety communication.

Figure 5:
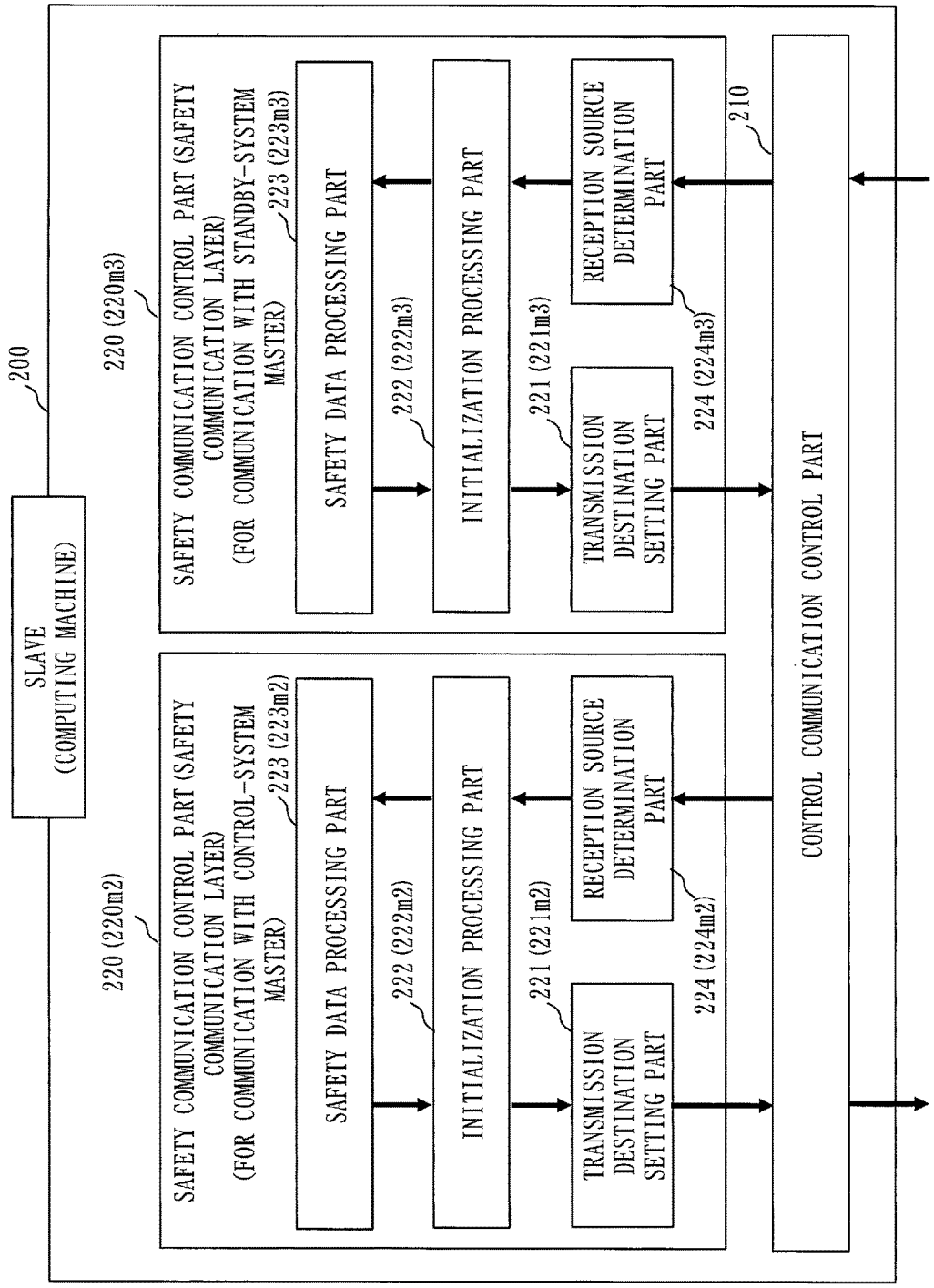
FIG. 5 is a diagram illustrating an example of the block configuration of a slave 200 according to the first embodiment.

FIG. 5 is a diagram illustrating an example of the block configuration of the slave 200 according to this embodiment.

The slave 200 includes a control communication control part 210 and a safety communication control part 220.

The control communication control part 210 controls transmission and reception of a frame required for the control communication at the slave 200.

The safety communication control part 220 is composed of a safety communication control part 220*m*2 for communication with the control-system master 100*a* and a safety communication control part 220*m*3 for communication with the standby-system master 100*b*. When described simply as the safety communication control part 220, this indicates both or either of the safety communication control parts 220*m*2 and 220*m*3.

The safety communication control part 220 controls transmission and reception of a safety frame required for the functional safety communication at the slave 200. In this embodiment, the safety communication control part 220*m*3 for communication with the standby-system master 100*b* is newly added to the slave 200.

The safety communication control part 220 includes a reception source determination part 224, a transmission destination setting part 221, an initialization processing part 222, and a safety data processing part 223.

The reception source determination part 224 obtains the safety frame transmitted to the safety communication control part 220.

The transmission destination setting part 221 sets a transmission destination of the safety frame.

The initialization processing part 222 receives a parameter which is included in the safety frame transmitted from the master 100 and which is used in the functional safety communication initialization sequence, and executes the functional safety communication initialization sequence. When the functional safety communication initialization sequence is executed with the standby-system master 100*b*, the functional safety communication initialization sequence is divided by the standby-system master 100*b* and is then executed.

In this embodiment, the initialization processing part 222 is newly added to the safety communication control part 220 of the slave 200.

The safety data processing part 223 performs processing of safety data required for measures against a communication error in the functional safety communication.

Figure 6:
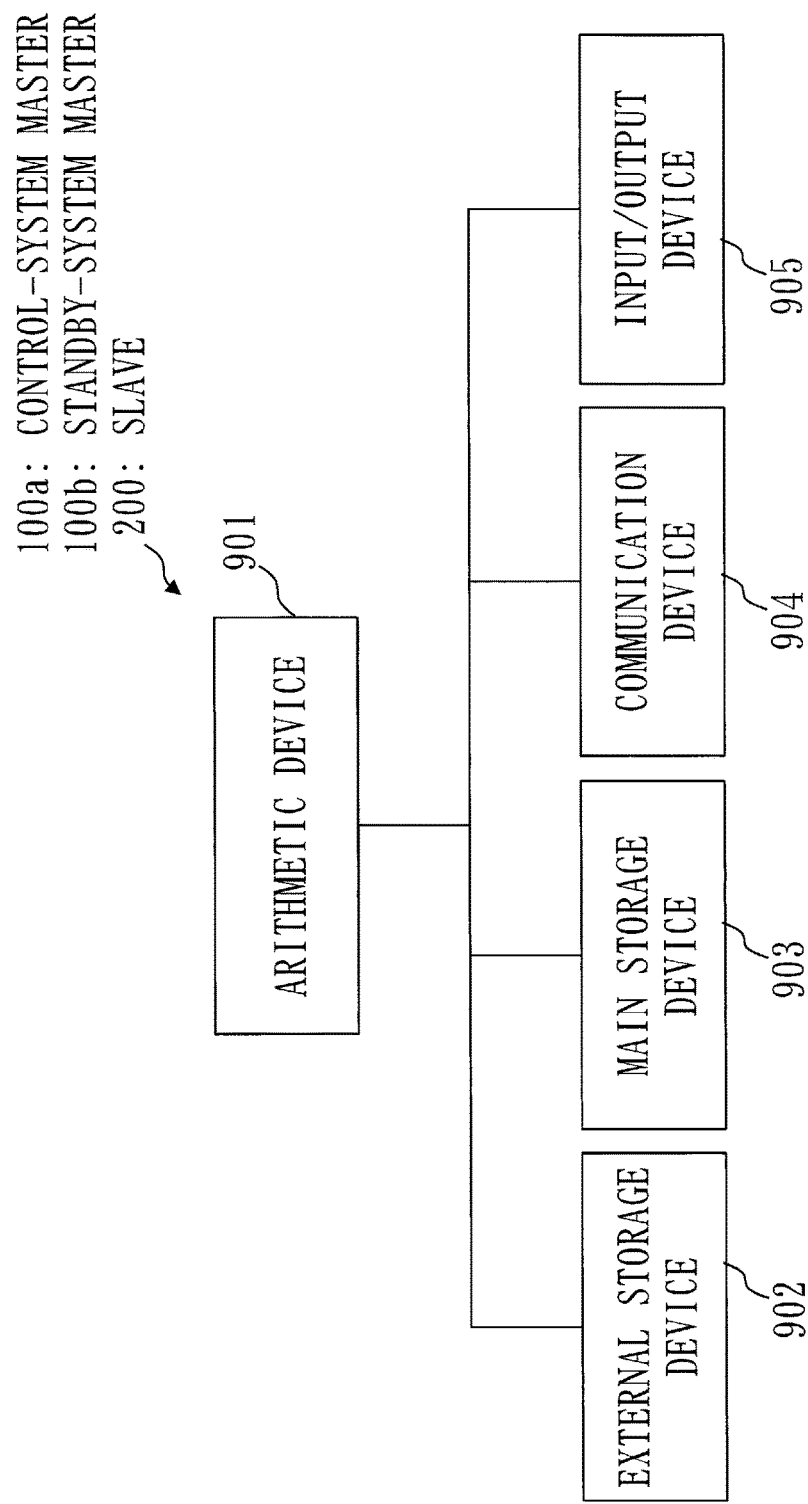
FIG. 6 is a diagram illustrating an example of the hardware configuration of the master 100 and the slave 200 according to the first embodiment.

FIG. 6 is a diagram illustrating an example of the hardware configuration of the control-system master 100*a*, the standby-system master 100*b*, and the slave 200 according to this embodiment.

With reference to FIG. 6, an example of the hardware configuration of the control-system master 100*a*, the standby-system master 100*b*, and the slave 200 will be described.

The control-system master 100*a*, the standby-system master 100*b*, and the slave 200 are each a computer, and each element of the control-system master 100*a*, the standby-system master 100*b*, and the slave 200 can be implemented by a program.

As the hardware configuration of each of the control-system master 100*a*, the standby-system master 100*b*, and the slave 200, an arithmetic device 901, an external storage device 902, a main storage device 903, a communication device 904, and an input/output device 905 are connected to a bus.

The arithmetic device 901 is a CPU (Central Processing Unit) that executes programs.

The external storage device 902 is, for example, a ROM (Read Only Memory), a flash memory, and a hard disk device.

The main storage device 903 is a RAM (Random Access Memory).

The communication device 904 is, for example, a communication board or the like and is connected to a LAN (Local Area Network) or the like. Instead of the LAN, the communication device 904 may be connected to a WAN (Wide Area Network) such as an IP-VPN (Internet Protocol Virtual Private Network), a wide-area LAN, and an ATM (Asynchronous Transfer Mode) network, or the Internet. The LAN, the WAN, and the Internet are examples of a network.

The input/output device 905 is, for example, a mouse, a keyboard, a display device and the like. In place of the mouse, a touch panel, a touch pad, a trackball, a pen tablet, or other types of pointing devices may be used. The display device may be an LCD (Liquid Crystal Display), a CRT (Cathode Ray Tube), or other types of display devices.

The programs are normally stored in the external storage device 902, and are loaded into the main storage device 903 to be sequentially read by the arithmetic device 901 and executed by the arithmetic device 901.

The programs implement each function described as a "part" in the block configuration diagrams.

Further, an operating system (OS) is also stored in the external storage device 902. At least part of the OS is loaded into the main storage device 903, and the arithmetic device 901 executes the programs that implement the functions of the "parts" illustrated in the block configuration diagrams while executing the OS.

Application programs are also stored in the external memory device 902. The application programs are loaded into the main memory device 903, and are sequentially executed by the arithmetic device 901.

Information such as a " . . . table" is also stored in the external memory device 902.

Information, data, signal values, and variable values indicating results of processes described as "evaluate", "determine", "extract", "detect", "set", "register", "select", "generate", "input", "output", and so on are stored as files in the main memory device 903.

Data that is received by the control-system master 100a, the standby-system master 100b, and the slave 200 is also stored in the main storage device 903.

An encryption key, a decryption key, a random number value, and a parameter may also be stored as files in the main memory device 903.

The configuration of FIG. 6 indicates an example of the hardware configuration of the control-system master 100a, the standby-system master 100b, and the slave 200, and the hardware configuration of the control-system master 100a, the standby-system master 100b, and the slave 200 is not limited to and may be different from the configuration described in FIG. 6.

Figure 7:
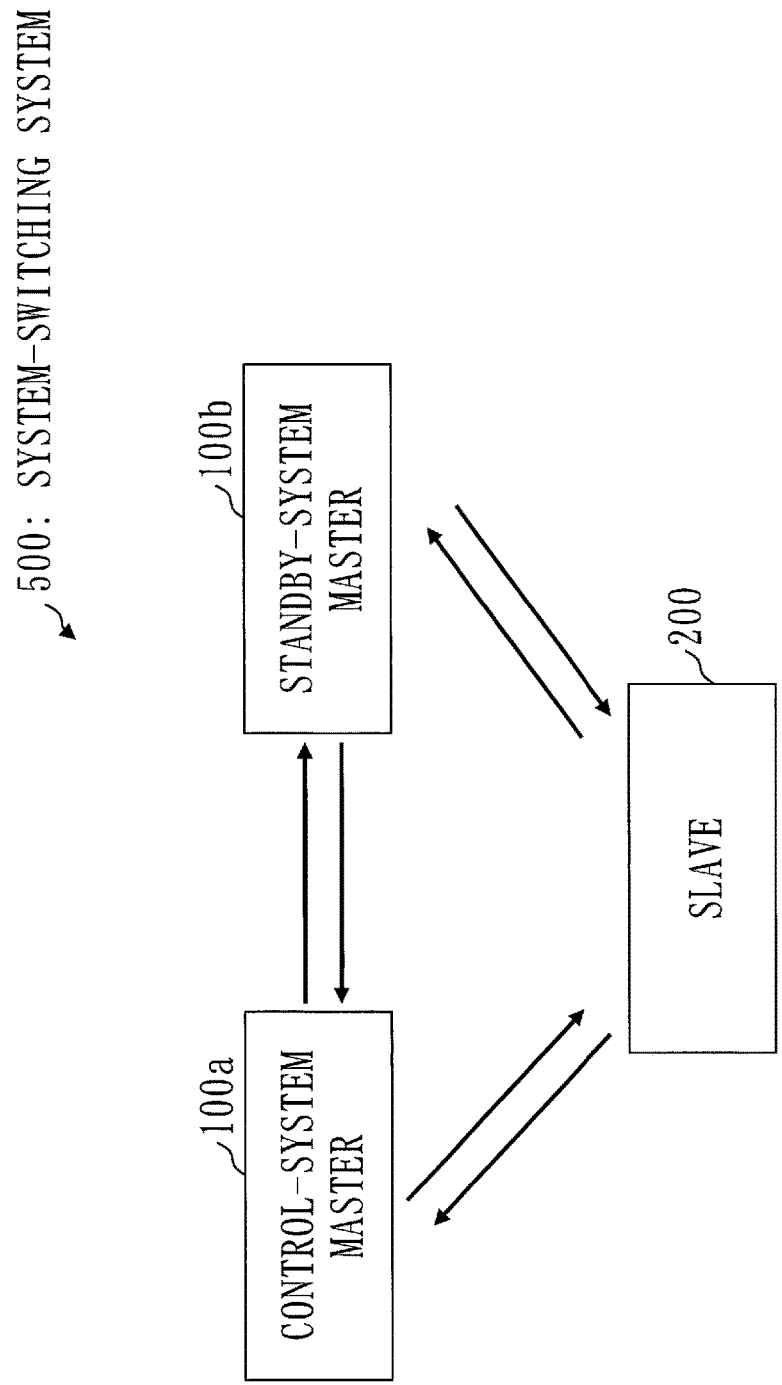
FIG. 7 is a diagram illustrating an example of the system configuration of the system-switching system 500 according to the first embodiment.

FIG. 7 is a diagram illustrating an example of the system configuration of the system-switching system 500 according to this embodiment. For ease of description, it is assumed herein that there is one slave 200. As described above, however, there may be a plurality of the slaves 200.

In the description of the operation below, the operation of portions related to the functional safety communication will be described by being divided into between the control-system master 100a and the slave 200, between the control-system master 100a and the standby-system master 100b, and between the standby-system master 100b and the slave 200.

Figure 8:
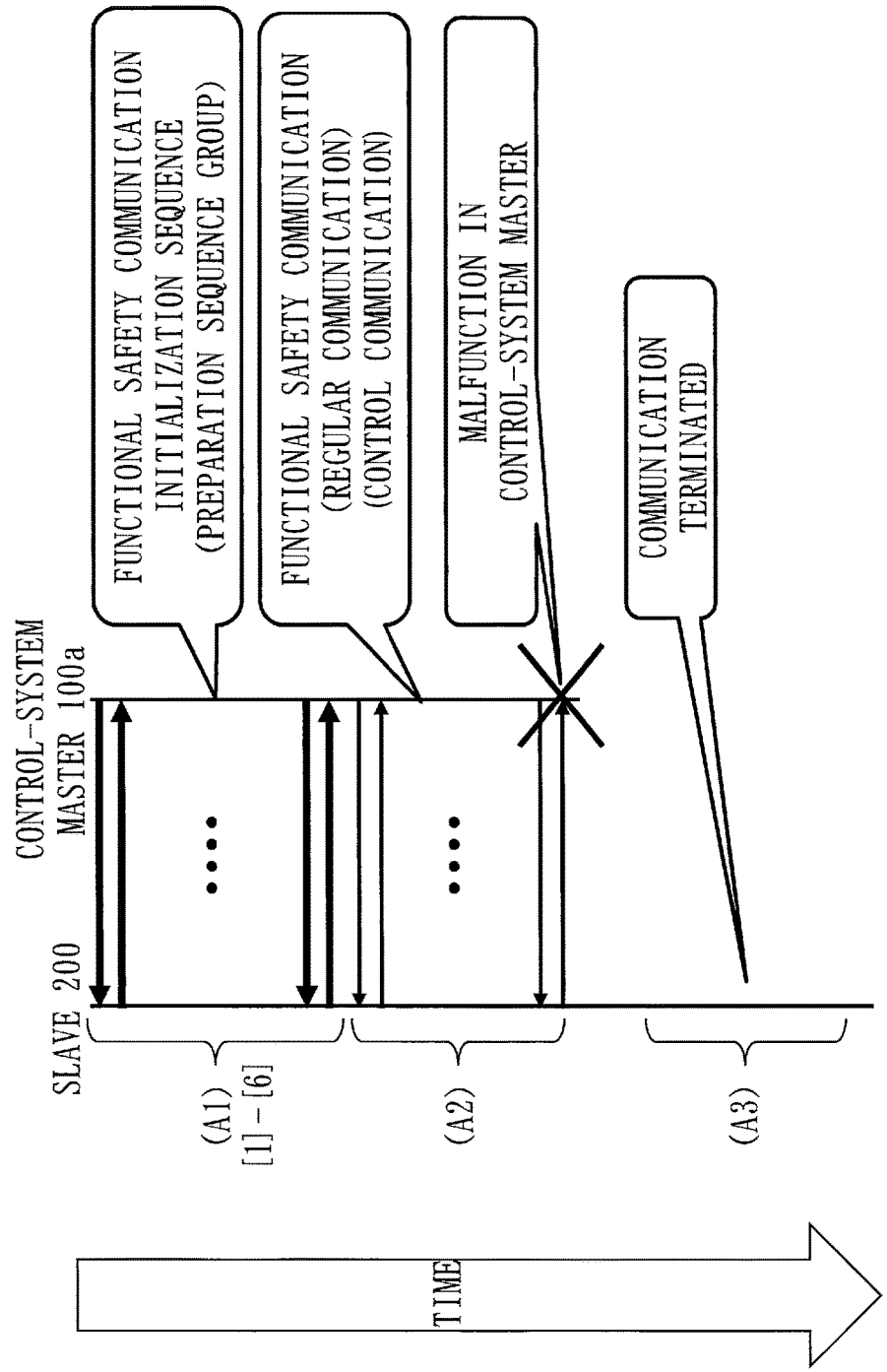
FIG. 8 is a diagram illustrating a communication sequence between the control-system master 100a and the salve 200 according to the first embodiment.

FIG. 8 is a diagram illustrating a communication sequence between the control-system master 100a and the slave 200 according to this embodiment.

With reference to FIG. 8, the communication sequence between the control-system master 100a and the slave 200 will be described.

A communication sequence (A1) is a communication sequence for establishing safety connection between the safety communication control part 120 (safety communication layer) of the control-system master 100a and the safety communication control part 220 (safety communication layer) of the slave 200. The communication sequence (A1) is a functional safety communication initialization sequence which is performed between the initialization processing part 122a of the control-system master 100a and the initialization processing part 222 of the slave 200 at setup of the system-switching system 500. In the functional safety communication initialization sequence, the following items are executed.
[1] A safety connection establishment request frame is transmitted and received, and a response frame is transmitted and received.
[2] A network parameter check request frame is transmitted and received, a response frame is transmitted and received, and a parameter is stored and retained in a buffer.
[3] A safety station parameter verification request frame is transmitted and received, a response frame is transmitted and received, and a parameter validity check is performed by the safety communication control part.
[4] If another optional function is required, a frame related to the optional function is transmitted, received, and processed.
[5] A refresh preparation and offset measurement request frame is transmitted and received, and a response frame is transmitted and received.
[6] Based on offset measurement information, a safety refresh and offset generation request frame is transmitted and received, and a response frame is transmitted and received.

A communication sequence (A2) is a sequence in which the control communication is executed as the functional safety communication between the control-system master 100a and the slave 200.

When a malfunction occurs in the control-system master 100a during the functional safety communication (A2), a communication sequence (A3) is started. In the communication sequence (A3), a communication error is detected by the safety communication control part 120 of the control-system master 100a and the safety communication control part 220 of the slave 200. When the communication error is detected, the safety connection between the safety communication control part 120 of the control-system master 100a and the safety communication control part 220 of the slave 200 is terminated in the communication sequence (A3).

Figure 9:
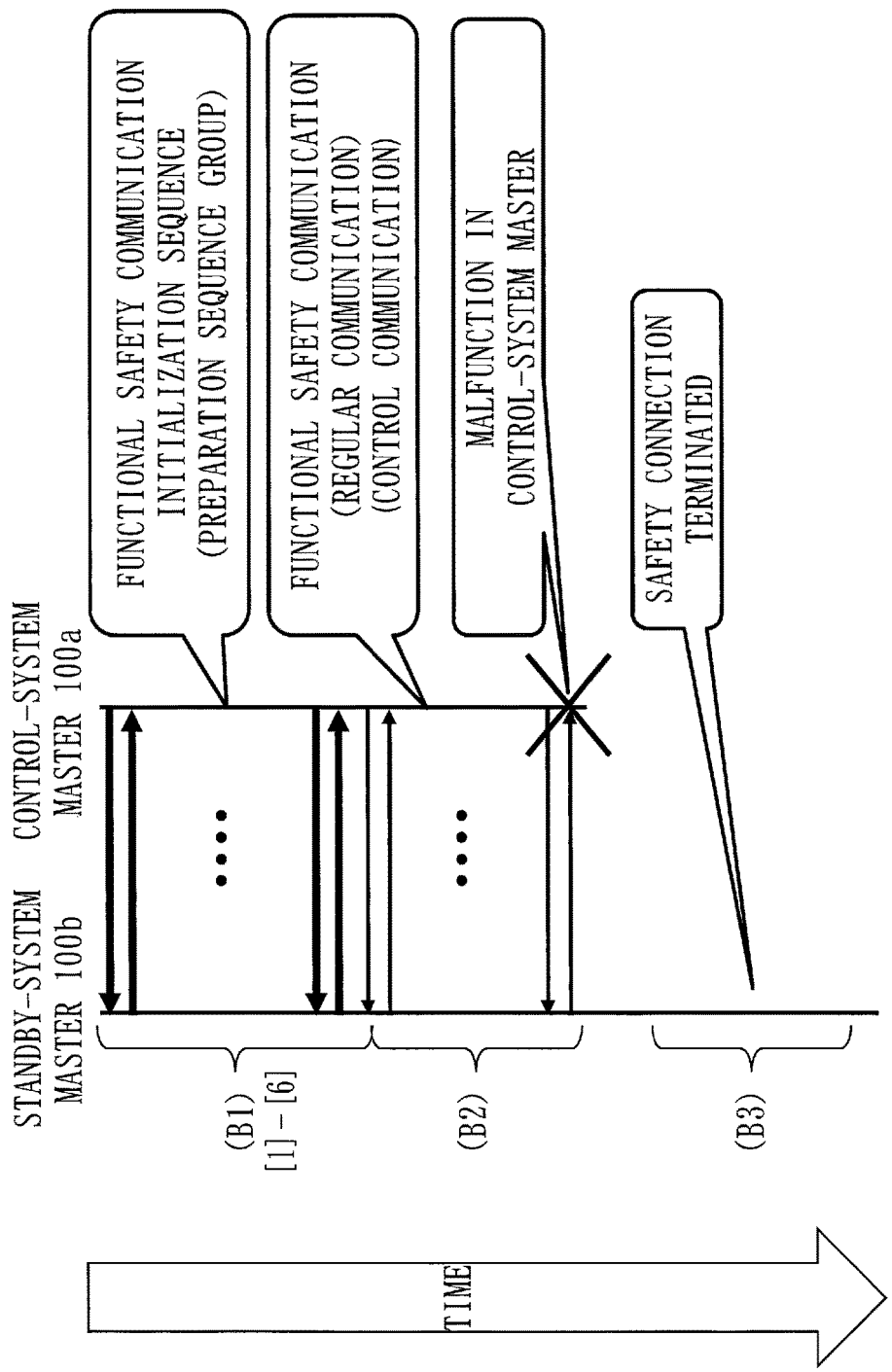
FIG. 9 is a diagram illustrating a communication sequence between the control-system master 100a and the standby-system master 100b according to the first embodiment.

FIG. 9 is a diagram illustrating a communication sequence between the control-system master 100a and the standby-system master 100b according to this embodiment.

With reference to FIG. 9, the communication sequence between the control-system master 100a and the standby-system master 100b will be described.

A communication sequence (B1) is a sequence for establishing safety connection between the safety communication control part 120 (safety communication layer) of the control-system master 100a and the safety communication control part 120 (safety communication layer) of the standby-system master 100b. The communication sequence (B1) is a functional safety communication initialization sequence which is performed between the initialization processing part 122a of the control-system master 100a and the initialization processing part 122b of the standby-system master 100b at setup of the system-switching system 500. In the functional safety communication initialization sequence, the following items are executed.
[1] A safety connection establishment request frame is transmitted and received, and a response frame is transmitted and received.
[2] A network parameter check request frame is transmitted and received, a response frame is transmitted and received, and a parameter is stored and retained in a buffer.
[3] A safety station parameter verification request frame is transmitted and received, a response frame is transmitted and received, and a parameter validity check is performed by the safety communication control part.
[4] If another optional function is required, a frame related to the optional function is transmitted, received, and processed.
[5] A refresh preparation and offset measurement request frame is transmitted and received, and a response frame is transmitted and received.
[6] Based on offset measurement information, a safety refresh and offset generation request frame is transmitted and received, and a response frame is transmitted and received.

A communication sequence (B2) is a sequence in which the functional safety communication is executed between the control-system master 100a and the standby-system master 100b.

In the communication sequence (B2), data required for switching of the systems is transmitted and received.

When a malfunction occurs in the control-system master 100a during the communication sequence (B2), a communication sequence (B3) is started. In the communication sequence (B3), a communication error is detected by the safety communication control part 120 of the control-system master 100a and the safety communication control part 120 of the standby-system master 100b. When the communication error is detected, the safety connection between the safety communication control part 120 of the control-system master 100a and the safety communication control part 120 of the standby-system master 100b is terminated in the communication sequence (B3).

Figure 10:
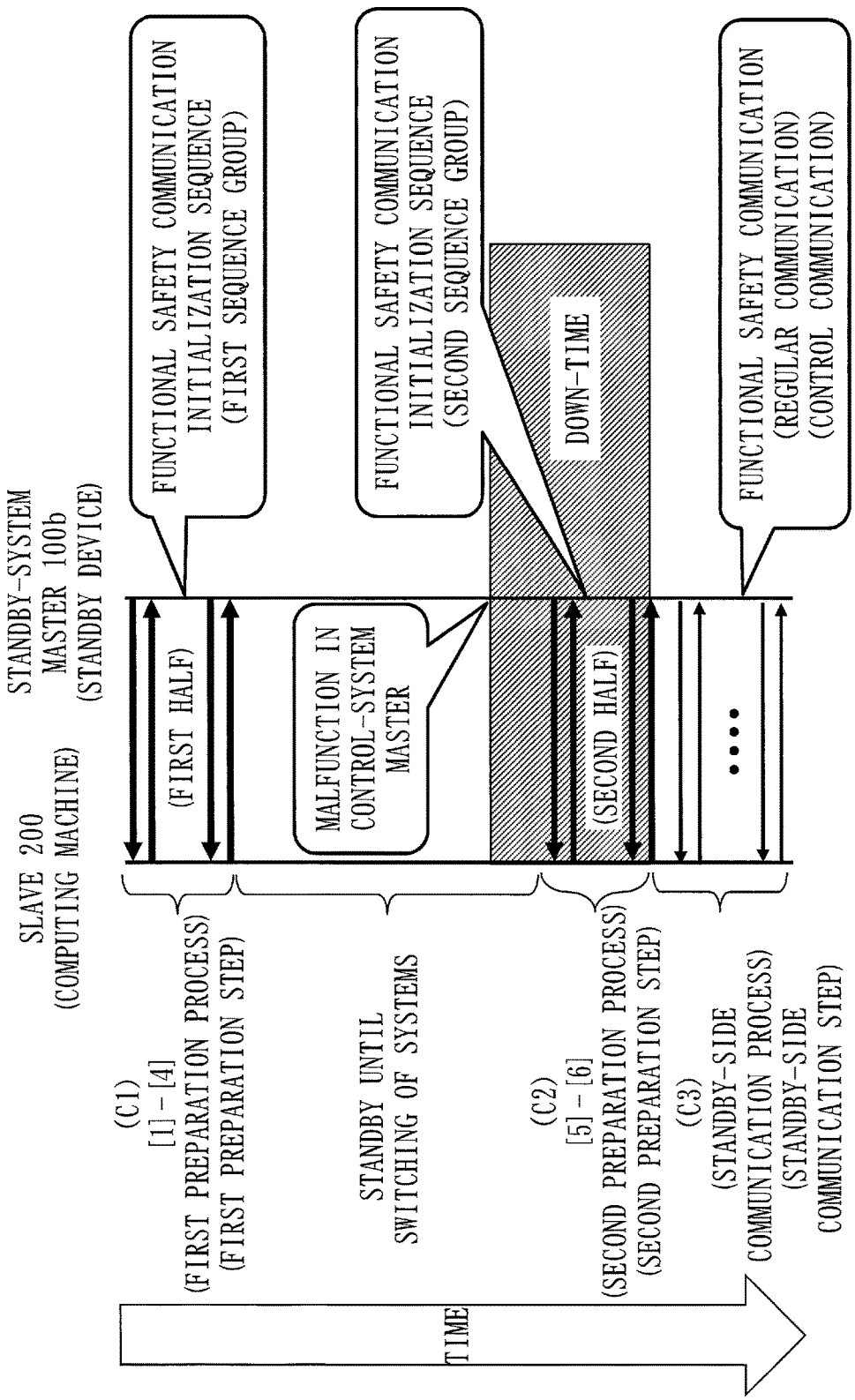
FIG. 10 is a diagram illustrating a communication sequence between the standby-system master 100b and the slave 200 according to the first embodiment.

FIG. 10 is a diagram illustrating a communication sequence between the standby-system master 100b and the slave 200 according to this embodiment.

With reference to FIG. 10, the communication sequence between the standby-system master 100b and the slave 200 will be described.

A communication sequence (C1) is part of a sequence for establishing safety connection between the safety communication control part 120 (safety communication layer) of the standby-system master 100b and the safety communication control part 220 (safety communication layer) of the slave 200. The communication sequence (C1) is the first sequence group which is part of the functional safety communication initialization sequence and which is performed between the first preparation part 1222b of the initialization processing part 122b of the standby-system master 100b and the initialization processing part 222 of the slave 200 at setup of the system-switching system 500. At setup of the system-switching system 500, the first preparation part 1222b executes, as the first sequence group, the following items of the functional safety communication initialization sequence [1] to [6] described above (a first preparation process, a first preparation step).

[1] A safety connection establishment request frame is transmitted and received, and a response frame is transmitted and received.
[2] A network parameter check request frame is transmitted and received, a response frame is transmitted and received, and a parameter is stored and retained in a buffer.
[3] A safety station parameter verification request frame is transmitted and received, a response frame is transmitted and received, and a parameter validity check is performed by the safety communication control part.
[4] If another optional function is required, a frame related to the optional function is transmitted, received, and processed.

When the communication sequence (C1) ([1] to [4]) is finished, the communication between the standby-system master 100b and the slave 200 is in a standby state until switching of the systems occurs.

When a malfunction occurs in the control-system master 100a, a communication sequence (C2) is started. The communication sequence (C2) is the second sequence group being sequences of the functional safety communication initialization sequence other than the first sequence group and which is performed between the second preparation part 1223b of the initialization processing part 122b of the standby-system master 100b and the initialization processing part 222 of the slave 200 after a failure of the control-system master 100a is detected.

In the communication sequence (C2), the standby-system master 100b and the slave 200 execute the second sequence group, and complete the establishment of safety connection between the safety communication control part 120b of the standby-system master 100b and the safety communication control part 220 of the slave 200.

The second sequence group of the functional safety communication initialization sequence includes the following items. The second preparation part 1223b executes the second sequence group (a second preparation process, a second preparation step).

[5] A refresh preparation and offset measurement request frame is transmitted and received, and a response frame is transmitted and received.
[6] Based on offset measurement information, a safety refresh and offset generation request frame is transmitted and received, and a response frame is transmitted and received.

A communication sequence (C3) is a sequence in which the control communication is executed as the functional safety communication between the standby-system master 100b and the slave 200 (a standby-side communication process, a standby-side communication step).

As described above, the functional safety communication initialization sequence is executed between the standby-system master 100b and the slave 200 by being divided into the first sequence group and the second sequence group.

A method for dividing the functional safety communication initialization sequence (initialization work determination method) will now be described.

A process for dividing the functional safety communication initialization sequence (initialization work determination process) is executed by a sequence division part 1221b of the initialization processing part 122b of the safety communication control part 120b of the standby-system master 100b.

Figure 11:
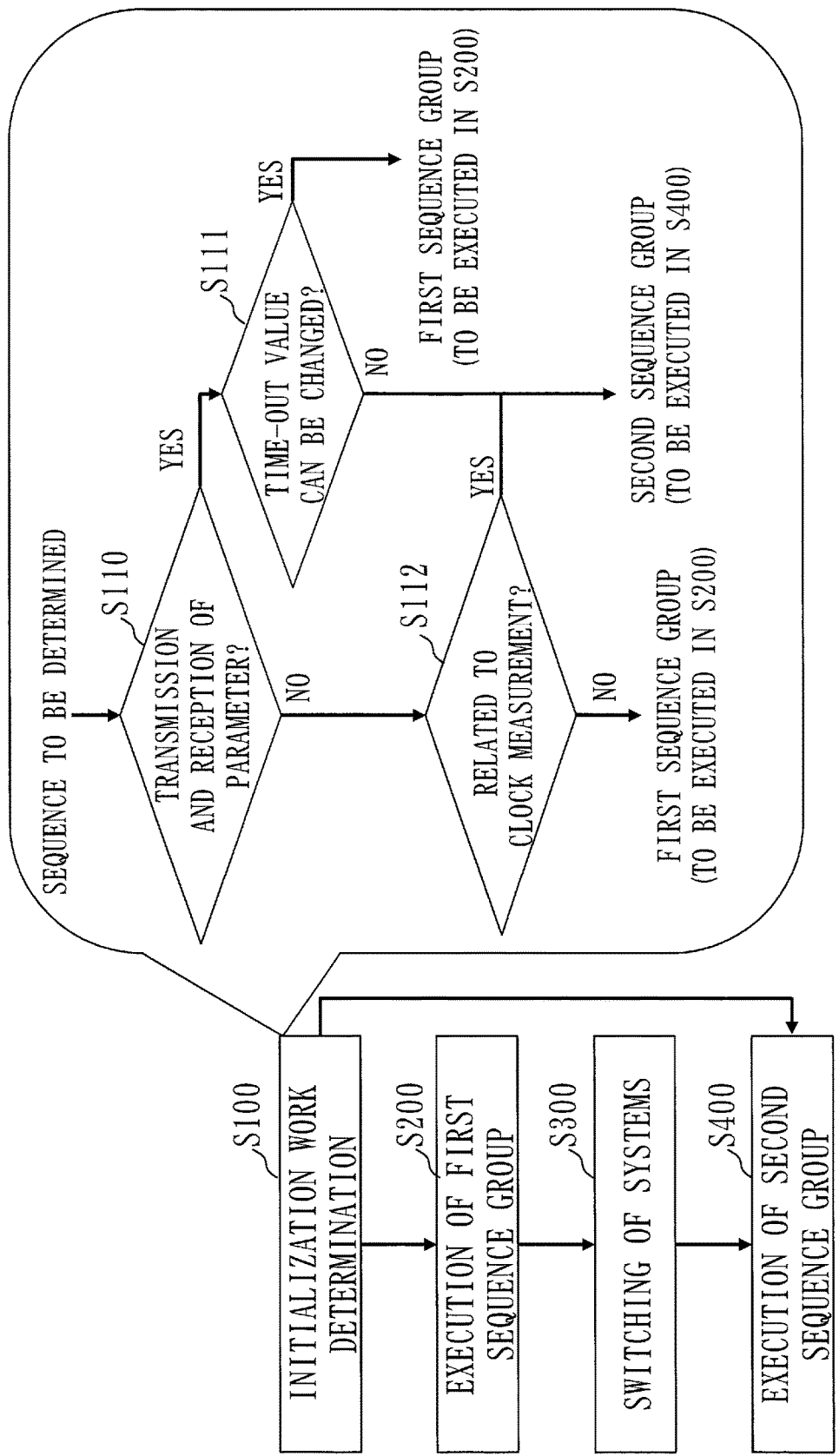
FIG. 11 is a flow diagram illustrating an initialization work determination process by an initialization processing part 112b of the standby-system master 100b according to the first embodiment.

FIG. 11 is a flow diagram illustrating the initialization work determination process by the sequence division part 1221b according to this embodiment.

Out of the functional safety communication initialization sequence, items related to clock measurement or not allowing a time-out value to be changed are executed after switching of the systems, because it is necessary to start the functional safety communication immediately after the initialization sequence is executed. Other items such as a safety connection ID, for example, for which it is not necessary to start the functional safety communication immediately after the initialization sequence, are executed before switching of the systems.

In S100, using a processing device, the sequence division part 1221b determines the timing for executing each of the functional safety communication initialization sequence [1] to [6]. The sequence division part 1221b executes the initialization work determination process for each of the functional safety communication initialization sequence [1] to [6]. A sequence to be processed out of the functional safety communication initialization sequence will be described as a processing target sequence.

In S110, the sequence division part 1221b determines whether or not the content of the processing target sequence is transmission and reception of a parameter. If the content of the processing target sequence is transmission and reception of a parameter (YES in S110), processing proceeds to S111. If the content of the processing target sequence is not transmission and reception of a parameter (NO in S110), processing proceeds to S112.

In S111, the sequence division part 1221b determines whether or not the content of the processing target sequence allows the time-out value to be changed.

If the content of the processing target sequence allows the time-out value to be changed (YES in S111), the sequence division part 1221b determines that the processing target sequence may be executed before switching of the systems and is to be included in the first sequence group to be executed in S200.

If the content of the processing target sequence does not allow the time-out value to be changed (NO in S111), the sequence division part 1221b determines that the processing target sequence should be executed after switching of the systems (S300) and is to be included in the second sequence group to be executed in S400.

In S112, the sequence division part 1221b determines whether or not the content of the processing target sequence is related to clock measurement.

If the content of the processing target sequence is not related to clock measurement (NO in S112), the sequence division part 1221b determines that the processing target sequence may be executed before switching of the systems and is to be included in the first sequence group to be executed in S200.

If the content of the processing target sequence is related to clock measurement (YES in S112), the sequence division part 1221b determines that the processing target sequence should be executed after switching of the systems (S300) and is to be included in the second sequence group to be executed in S400.

As described above, in the system-switching system 500 according to this embodiment, items that require communication to be started immediately after execution of the sequence are executed after switching of the systems and other items are executed before switching of the systems, out of the functional safety communication initialization sequence. FIG. 11 is a flowchart illustrating criteria for dividing the functional safety communication initialization sequence. An application for grouping the functional safety communication initialization sequence based on this flowchart may be created and incorporated in the safety communication control part 120b.

According to the system-switching system 500 according to this embodiment, the functional safety communication initialization sequence [1] to [4] are executed before switching of the systems, and [5] and [6] are executed after occurrence of switching of the systems, thereby reducing the functional safety initialization sequence to be executed after occurrence of switching of the systems. As a result, the down-time can be reduced even in a case where the functional safety communication based on connection-type communication is introduced to the network system illustrated in FIG. 1.

Second Embodiment

In this embodiment, differences from the first embodiment will be mainly described.

A component part that has substantially the same function as the component part described in the first embodiment will be given the same reference numeral, and description thereof may be omitted.

In the system-switching system 500 described in the first embodiment, if a malfunction occurs in the standby-system master 100b while the control communication is being executed between the control-system master 100a and the slave 200, the malfunction in the standby-system master 100b cannot be detected until switching of the systems occurs and the standby-system master 100b is activated. It thus takes time to detect the malfunction in the standby-system master 100b. For this reason, there is a risk that the down-time may be prolonged due to a delay in replacing the device, the operation of the system may be halted because the device is not replaced in time, and so on.

Figure 12:
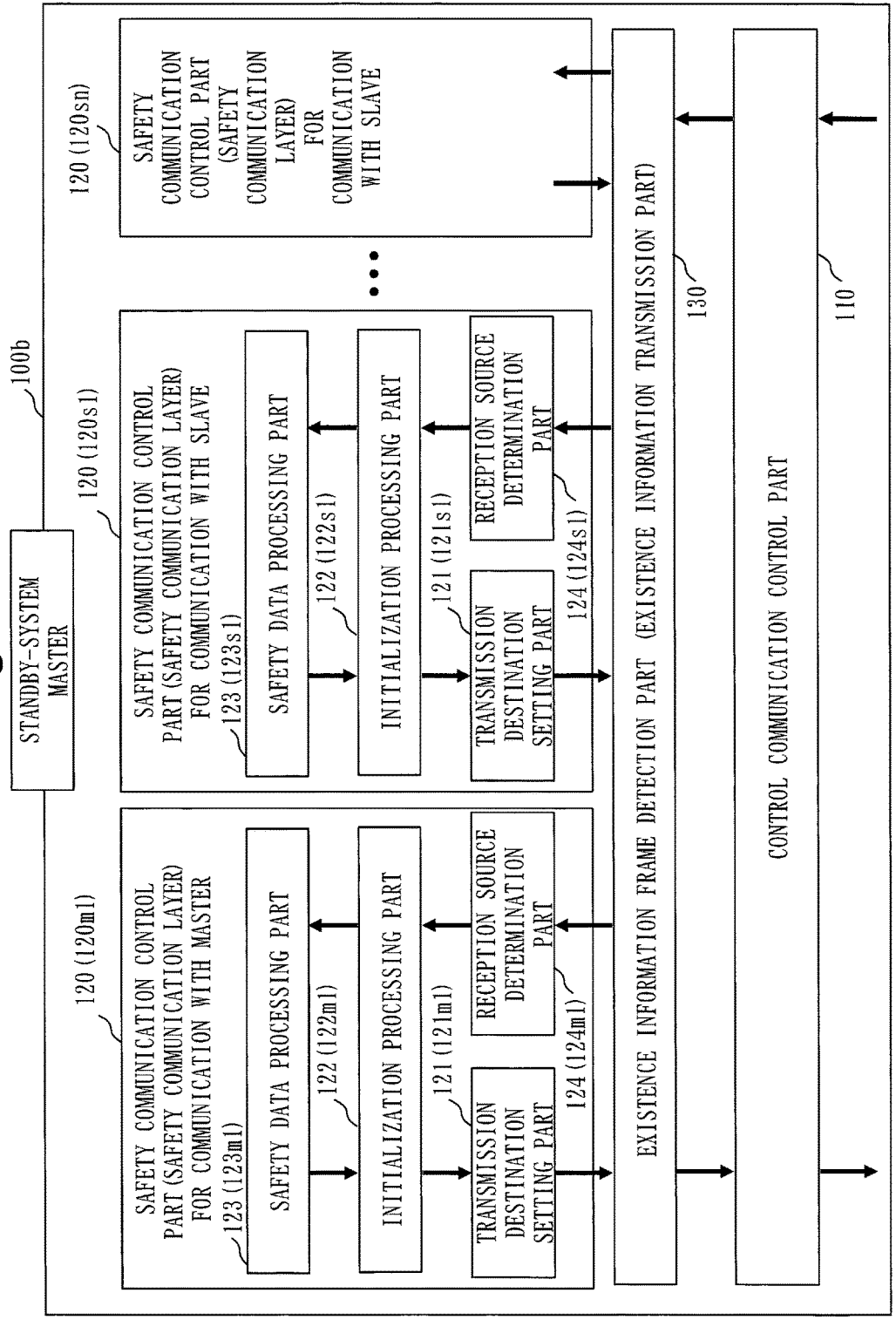
FIG. 12 is a diagram illustrating an example of the block configuration of the standby-system master 100b according to a second embodiment.

FIG. 12 is a diagram illustrating an example of the block configuration of the standby-system master 100b according to this embodiment.

As illustrated in FIG. 12, the standby-system master 100b includes an existence information frame detection part 130 in addition to the configuration of FIG. 4 described in the first embodiment.

The existence information frame detection part 130 has functions to receive an existence information frame 131 including existence information which is transmitted from the control-system master 100a and transfer the received existence information frame 131 to all the salves 200.

While executing the control communication with the slave 200, the control-system master 100a transmits the existence information frame 131, including existence information indicating that a failure has not occurred, to the standby-system master 100b after every predetermined time (transmission interval time).

The existence information frame detection part 130 is an example of an existence information transmission part that, when the existence information frame 131 is received from the control-system master 100a, transmits the received existence information frame 131 to the slave 200.

Figure 13:
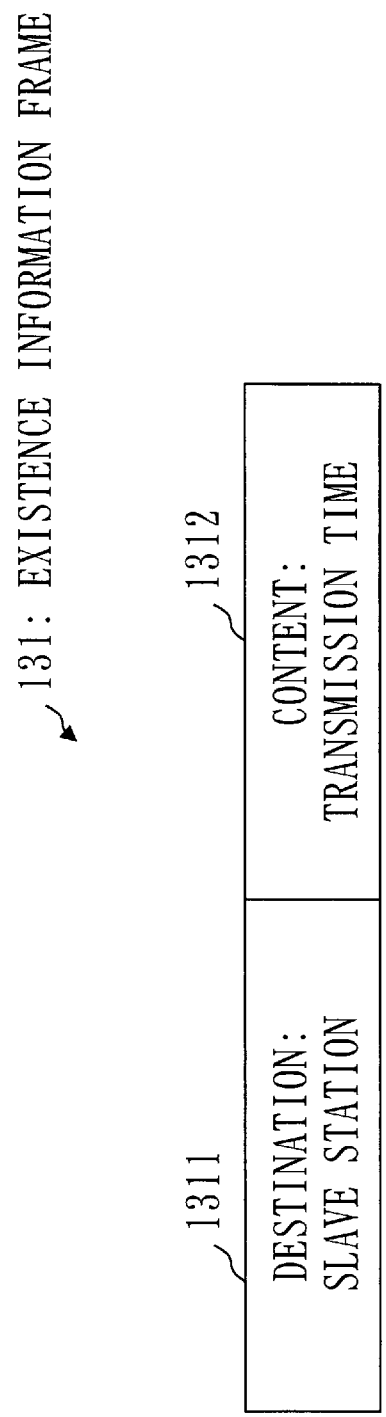
FIG. 13 is a diagram illustrating an example of the configuration of an existence information frame 131 according to the second embodiment.

FIG. 13 is a diagram illustrating an example of the configuration of the existence information frame 131 according to this embodiment.

As illustrated in FIG. 13, a destination slave station 1311 and a transmission time 1312 are set in the existence information frame 131. In the transmission time 1312, the time at which the existence information frame 131 is transmitted from the control-system master 100a is recorded.

Figure 14:
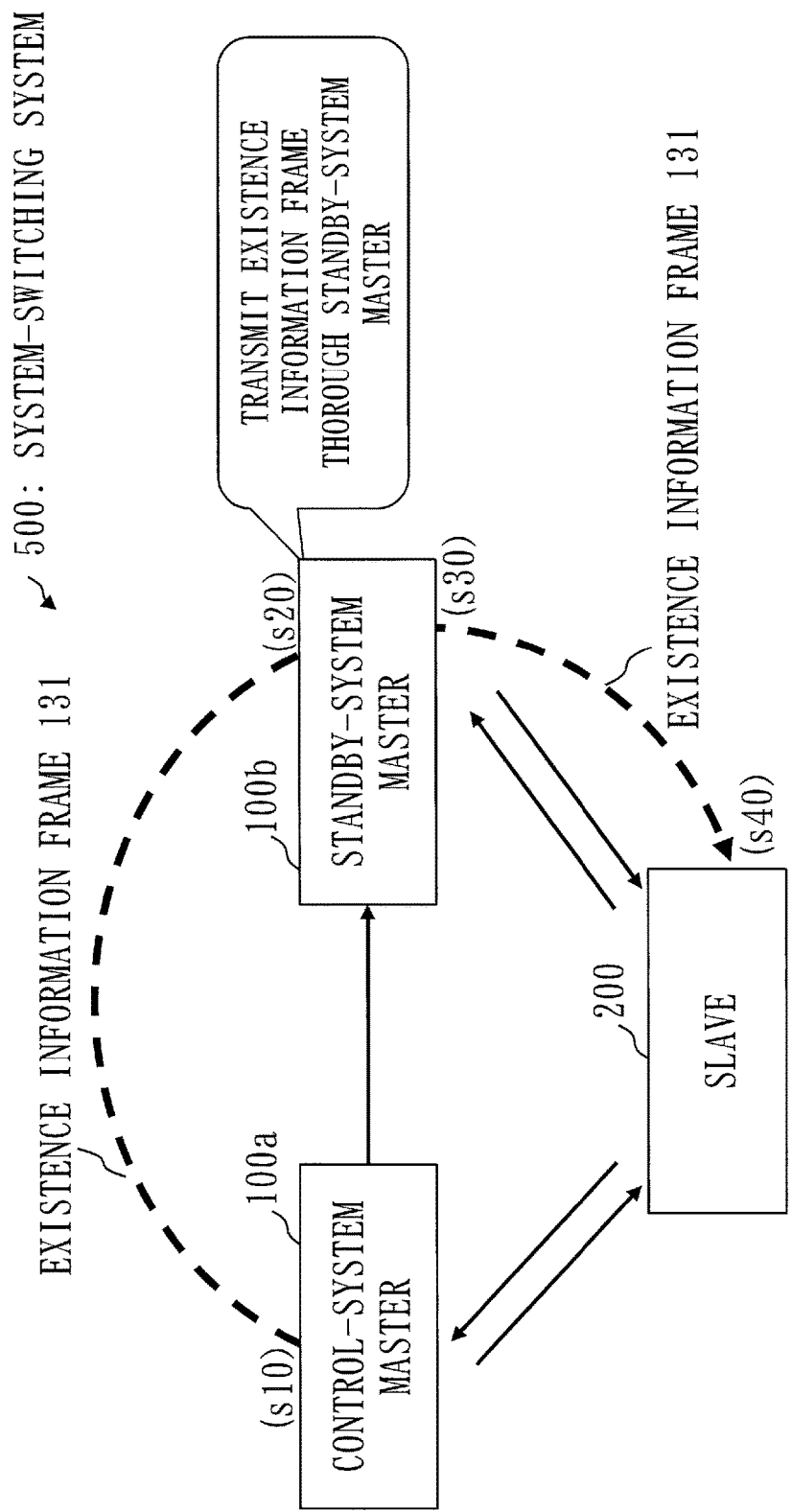
FIG. 14 is a diagram for describing the operation of the system-switching system 500 according to the second embodiment.

FIG. 14 is a diagram for describing the operation of the system-switching system 500 according to this embodiment.

With reference to FIG. 14, the operation of the system-switching system 500 will be described.

In S10, the control-system master 100a generates the existence information frame 131 indicating that a failure has not occurred by setting the destination slave station 1311 in the existence information frame 131 and also setting a transmission time in the transmission time 1312 in the existence information frame 131. The control-system master 100a transmits the generated existence information frame 131 to the standby-system master 100b.

The control-system master 100a transmits the existence information frame 131 to the standby-system master 100b after every predetermined time (transmission interval time). The control-system master 100a transmits the existence information frame 131 to the standby-system master 100b while executing the functional safety communication with the standby-system master 100b (phase (B2) of FIG. 9).

In S20, the existence information frame detection part 130 of the standby-system master 100b receives the existence information frame 131.

In S30, the existence information frame detection part 130 transmits the received existence information frame 131 to the slave 200. In this way, the existence information frame 131 is transferred from the control-system master 100a to the slave 200 through the standby-system master 100b.

In S40, the slave 200 receives the existence information frame 131 transmitted by the existence information frame detection part 130. The slave 200 obtains the transmission time 1312 recorded in the received existence information frame 131. Then, using a processing device, the slave 200 measures the reception interval time from the obtained transmission time 1312 until the next existence information frame 131 is received.

If the measured reception interval time exceeds a predetermined threshold value, the slave 200 determines that a failure has occurred in the standby-system master 100b. That is, if the process for receiving the existence information frame 131 times out, the slave 200 recognizes that a malfunction has occurred in the standby-system master 100b.

The reception interval time is set to be slightly longer than the transmission interval time. The reception interval time and the transmission interval time may be changed as appropriate by the system administrator.

As described above, according to the system-switching system 500 according to this embodiment, the existence information frame 131 is transmitted from the control-system master 100a through the standby-system master 100b. Thus, in a case where a malfunction occurs simultaneously in both of the two masters and a case where a malfunction occurs in the standby-system master 100b first, the slave 200 can detect the malfunction promptly.

According to the system-switching system 500 according to this embodiment, a malfunction in the standby-system master 100b can be detected by a time-out while the safety functional communication is being executed between the control-system master 100a and the slave 200, compared with a method by which mutual existence is checked by connection-type communication only between the control-system master 100a and the slave 200, between the control-system master 100a and the standby-system master 100b, and between the standby-system master 100b and the slave 200. Therefore, the slave 200 can detect a malfunction in both of the control-system master 100a and the standby-system master 100b in the shortest time. A malfunction can be detected in the shortest time in both of the masters, so that the device may be replaced promptly. It is thus possible to reduce the down-time and avoid a system halt.

Third Embodiment

In this embodiment, differences from the first and second embodiments will be mainly described.

A component part that has substantially the same function as the component part described in the first and second embodiments will be given the same reference numeral, and description thereof may be omitted.

In the methods described in the first and second embodiments, there is a risk that in switching from the control-system master 100a to the standby-system master 100b, data before switching of the systems may remain in the slave 200 and the data before switching of the systems may be mixed with data after switching of the systems, causing improper operation in the system.

Figure 15:
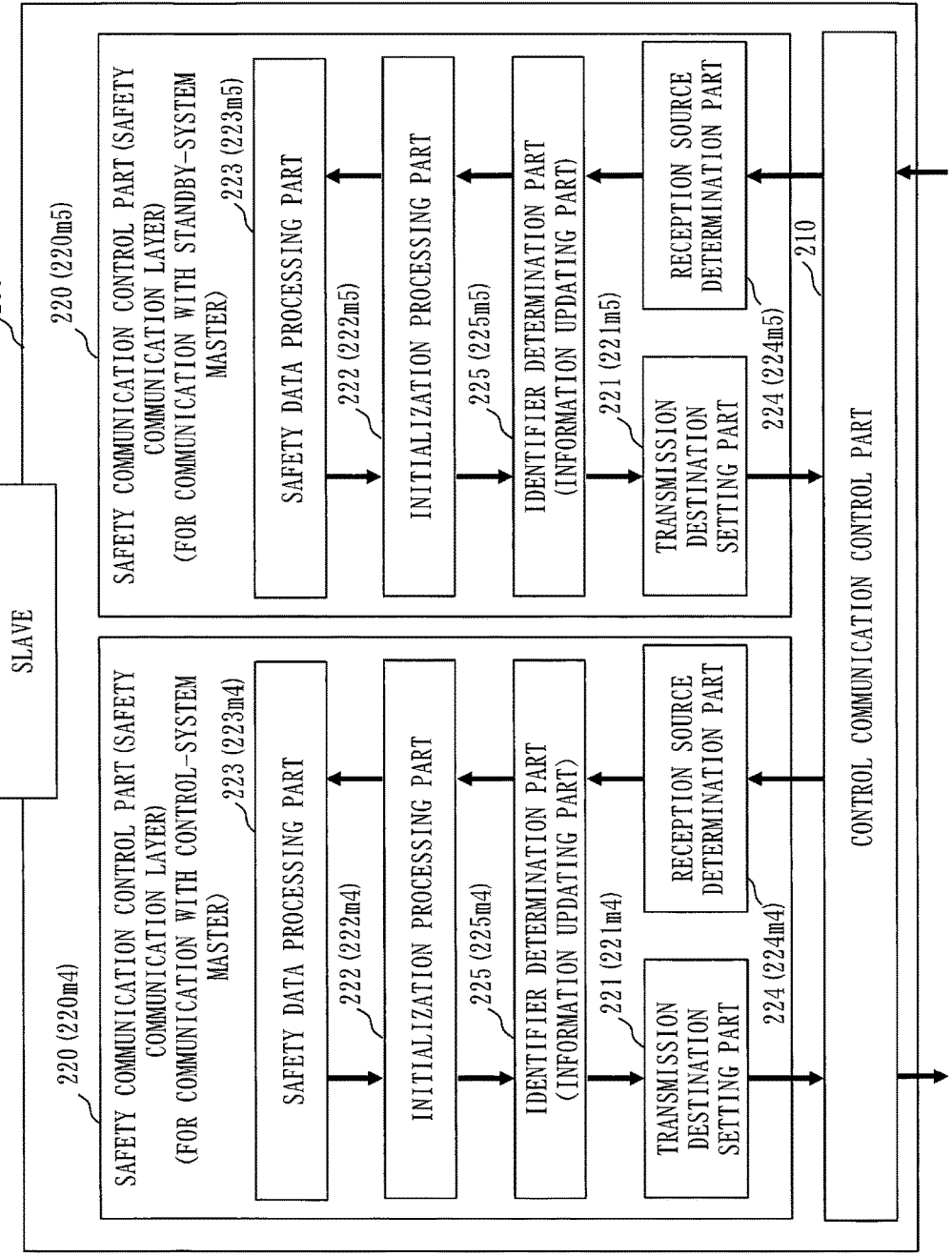
FIG. 15 is a diagram illustrating an example of the configuration of the slave 200 according to a third embodiment.

FIG. 15 is a diagram illustrating an example of the configuration of the slave 200 according to this embodiment.

As illustrated in FIG. 15, the slave 200 includes the safety communication control part 220 for each master. The safety communication control part 220 for communication with the control-system master 100a will be described as a safety communication control part 220m4. The safety communication control part 220 for communication with the standby-system master 100b will be described as a safety communication control part 220m5.

The safety communication control part 220 (220m4, 220m5) includes an identifier determination part 225 (225m4, 225m5) in addition to the configuration of the slave 200 of FIG. 5. The safety communication control part 220m4 includes the identifier determination part 225m4, and the safety communication control part 220m5 includes the identifier determination part 225m5.

The identifier determination part 225 determines an identifier transmitted from the standby-system master 100b, and if data before switching of the systems remains in the buffer, deletes the data before switching of the systems.

Figure 16:
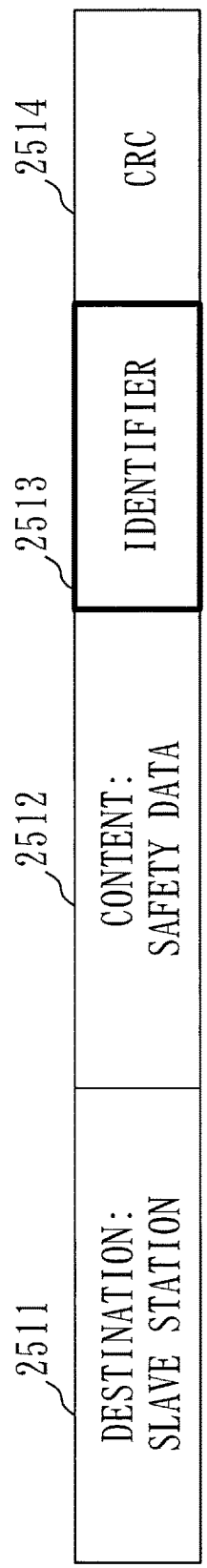
FIG. 16 is a diagram illustrating an example of the configuration of a safety frame 250 of functional safety communication according to the third embodiment.

FIG. 16 is a diagram illustrating an example of the configuration of a safety frame 250 received by the slave 200 according to this embodiment.

The safety frame 250 is a frame which is transmitted and received between the master and the salve in the functional safety communication and in which information required for performing a communication error check (an example of control safety information) is stored.

The safety frame 250 is normally composed of a destination slave station 2511, safety data 2512, and a CRC 2514. In addition to this configuration, an identifier 2513 for identifying the master that has transmitted the safety frame is set in the safety frame 250 according to this embodiment.

The slave 200 includes the buffer and stores control communication information used for the control communication in the buffer. The identifier determination part 225 receives the safety frame 250 (control data) which is received by the functional safety communication (control communication) and which includes the identifier 2513 for identifying whether the safety frame 250 has been transmitted from the control-system master 100a or the standby-system master 100b. The identifier determination part 225 is an example of an information updating part that updates the control communication information based on the identifier 2513 included in the received safety frame 250.

Figure 17:
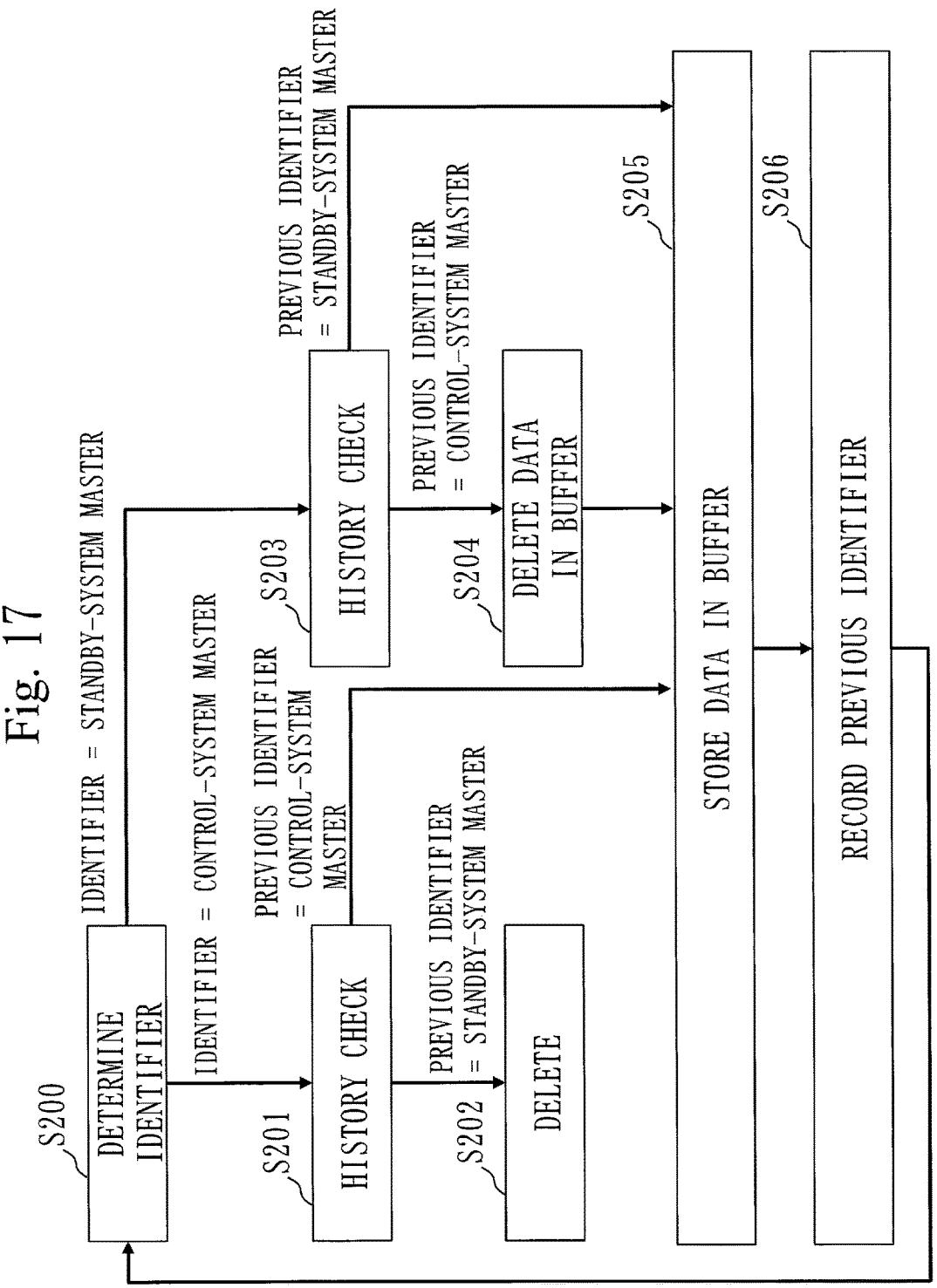
FIG. 17 is a flowchart illustrating the operation of an identifier determination process in the system-switching system 500 according to the third embodiment.

FIG. 17 is a flowchart illustrating the operation of an identifier determination process in the system-switching system 500 according to this embodiment.

The identifier determination part 225 is activated after the safety connection between the control-system master 100a and the slave 200 is established and the functional safety communication is started. With reference to FIG. 17, an outline of the operation of the identifier determination part 225 will be described. The identifier determination part 225 executes the following operation repeatedly.

In S200, using the processing device, the identifier determination part 225 determines whether the identifier 2513 in a transmitted safety frame 251 indicates the control-system master 100a or the standby-system master 100b.

If it is determined in S200 that the identifier 2513 is the control-system master 100a, processing proceeds to S201.

If it is determined in S200 that the identifier 2513 is the standby-system master 100b, processing proceeds to S203.

<When the Identifier 2513 is the Control-System Master 100a>

In S201, using the processing device, the identifier determination part 225 compares a previous identifier which has been recorded by a history check with the identifier 2513 in the transmitted safety frame 251. Note that the initial value of the previous identifier is the control-system master 100a.

If the previous identifier is the standby-system master 100b, this means that delayed data is received from the control-system master even though switching of the systems has been completed. Thus, in S202, the identifier determination part 225 deletes the safety data 2512 in the transmitted safety frame 251.

If the previous identifier is the control-system master 100a, the safety data 2512 in the transmitted safety frame 251 is stored in the buffer in S205, and processing proceeds to S206.

In S206, the identifier determination part 225 retains the identifier of the control-system master 100a set in the previous identifier. Alternatively, the identifier determination part 225 may overwrite the previous identifier with the identifier of the control-system master 100a.

<When the Identifier 2513 is the Standby-System Master 100b>

In S203, using the processing device, the identifier determination part 225 compares a previous identifier which has been recorded by a history check with the identifier 2513 in the transmitted safety frame 251.

If the previous identifier is the control-system master 100a, the identifier determination part 225 deletes the data in the buffer in S204, and then stores the safety data 2512 in the transmitted safety frame 251 in the buffer (S205). Then, the identifier determination part 225 changes the previous identifier to the identifier of the standby-system master 100b (S206).

If the previous identifier is the standby-system master 100b, processing proceeds to S205, and the safety data 2512 in the transmitted safety frame 251 is stored in the buffer. In S206, the identifier determination part 225 retains the identifier of the standby-system master 100b set in the previous identifier. Alternatively, the identifier determination part 225 may overwrite the previous identifier with the identifier of the standby-system master 100b.

As described above, in the system-switching system 500 according to this embodiment, the identifier which is given by the master is introduced to the safety frame 250. When the slave 200 receives the identifier transmitted from the standby-system master 100b, the slave 200 deletes the data before switching of the systems remaining in the buffer and then receives data. It is therefore possible to prevent improper operation due to the safety data 2512 before switching of the systems remaining in the slave 200.

In a method in which the slave receives only the safety data, there is a risk that if data of the control-system master remains in the slave or if delayed data of the control-system master is received after data of the standby-system master is received, the data received from the control-system master may be executed even though switching of the systems has been completed.

According to the system-switching system 500 according to this embodiment, an identifier is added to the safety data, and when the slave receives the identifier of the standby-system master after receiving the identifier of the control-system master, it is possible to delete the data in the slave completely and then execute the received safety data. With the identifier and the operation of the slave as described above, data before switching of the systems received from the control-system master can be prevented from being executed after switching of the systems, and improper operation of the system can be prevented.

The block configurations of the master 100 and the block configurations of the slave 200 described in the first to third embodiments above are not limited to the configurations of the first to third embodiments. These functional blocks may be used in any combination to configure the master 100 and the slave 200.

The embodiments of the present invention have been described above. Two or more of these embodiments may be implemented in combination. Alternatively, one of these embodiments may be partially implemented. Alternatively, two or more of these embodiments may be partially implemented in combination. The present invention is not limited to these embodiments, and various modifications are possible as appropriate.

REFERENCE SIGNS LIST

100: master, 100a: control-system master, 100b: standby-system master, 110: control communication control part, 120: safety communication control part, 121: transmission destination setting part, 122: initialization processing part, 123: safety data processing part, 124: reception source determination part, 130: existence information frame detection part, 131: existence information frame, 200: slave, 210: control communication control part, 220: safety communication control part, 221: transmission destination setting part, 222: initialization processing part, 223: safety data processing part, 224: reception source determination part, 225: identifier determination part, 250: safety frame, 500: system-switching system, 901: arithmetic device, 902: external storage device, 903: main storage device, 904: communication device, 905: input/output device, 1221: sequence division part, 1222: first preparation part, 1223: second preparation part, 1311: destination slave station, 1312: transmission time, 2511: destination slave station, 2512: safety data, 2513: identifier, 2514: CRC

The invention claimed is:

1. A communication system comprising a computing machine, a control device to control the computing machine, and a standby device to replace the control device when a failure occurs in the control device,
the control device including:
    a control-side preparation part to execute a preparation sequence group including a plurality of sequences together with the computing machine; and
    a control-side communication part to start control communication for controlling the computing machine with the computing machine after execution of the preparation sequence group is completed by the control-side preparation part,
the standby device including:
    a first preparation part to execute a first sequence group being one or some of the plurality of sequences included in the preparation sequence group together with the computing machine when the preparation sequence group is started between the control device and the computing machine by the control-side preparation part;
    a second preparation part to execute a second sequence group consisting of a sequence of the preparation sequence group other than the first sequence group together with the computing machine when a failure of the control device is detected after execution of the first sequence group is completed by the first preparation part; and
    a standby-side communication part to start the control communication with the computing machine after execution of the second sequence group is completed by the second preparation part,
wherein the plurality of sequences is a functional safety communication initialization sequence executed between the slave device and one of the control device and the standby device prior too operations in which said one of the control device and the standby device controls the slave device.

2. The communication system according to claim 1, wherein the standby device further includes
a sequence division part to divide the preparation sequence group into the first sequence group and the second sequence group based on content of each sequence included in the preparation sequence group.

3. The communication system according to claim 1, wherein the control device transmits existence information indicating that a failure has not occurred to the standby device after every predetermined time, while the control communication is being executed with the computing machine, wherein the standby device includes an existence information transmission part to, when the existence information is received from the control device, transmit the received existence information to the computing machine, and wherein the computing machine receives the existence information from the existence information transmission part, measures a reception interval time from when the existence information is received until when next existence information is received, and if the reception interval time exceeds a predetermined threshold value, determines that a failure has occurred in the control device or the standby device.

4. The communication system according to claim 1, wherein the computing machine includes a buffer and stores control communication information which is used for the control communication in the buffer, and wherein the computing machine includes an information updating part to receive control data which is received through the control communication and which includes an identifier for identifying whether the control data has been transmitted from the control device or the standby device, and update the control communication information based on the identifier included in the received control data.

5. The communication system according to claim 1, wherein the computing machine is a slave device controlled by the control device and the standby device when the control device is not available.

6. The communication system according to claim 5, wherein the plurality of sequences comprise:

a first sequence comprising a safety connection establishment request and response, a second sequence comprising a network parameter check request, response, and a retention of the parameter, a third sequence comprising a safety station parameter verification request and a response, and a parameter validity check, a fourth sequence comprising, if an optional function is required, a frame related to the optional function is exchanged, a fifth sequence comprising a refresh preparation and an offset measurement request and response, and a sixth sequence comprising, based on offset measurement information received in the offset measurement request and response, a safety refresh and an offset generation request and response are executed.

7. The communication system according to claim 6, wherein at least said first to third sequences of the plurality of sequences are executed in the first sequence group.

8. A standby device to replace a control device when a failure occurs in the control device to control a computing machine, the standby device comprising:

a first preparation part to, when a preparation sequence group including a plurality of sequences, to be executed before starting control communication for controlling the computing machine, is started between the computing machine and the control device, execute a first sequence group consisting of one or some of the plurality of sequences included in the preparation sequence group together with the computing machine;

a second preparation part to execute a second sequence group being a sequence of the preparation sequence group other than the first sequence group together with the computing machine when a failure of the control device is detected after execution of the first sequence group is completed by the first preparation part; and a standby-side communication part to start the control communication with the computing machine after execution of the second sequence group is completed by the second preparation part, wherein the plurality of sequences is a functional safety communication initialization sequence executed between the slave device and one of the control device and the standby device prior to operations in which said one of the control device and the standby device controls the slave device.

9. The standby device according to claim 8, further comprising a sequence division part to divide the preparation sequence group into the first sequence group and the second sequence group based on content of each sequence included in the preparation sequence group.

10. A communication method for a communication system including a computing machine, a control device to control the computing machine, and a standby device to replace the control device when a failure occurs in the control device, the communication method comprising:

executing a preparation sequence group including a plurality of sequences between the control device and the computing machine;

starting control communication for controlling the computing machine between the control device and the computing machine after execution of the preparation sequence group is completed;

executing a first sequence group consisting of one or some of the plurality of sequences included in the preparation sequence group between the standby device and the computing machine when the preparation sequence group is started between the control device and the computing machine;

executing a second sequence group consisting of a sequence of the preparation sequence group other than the first sequence group between the standby device and the computing machine when a failure of the control device is detected after execution of the first sequence group is completed; and starting the control communication between the standby device and the computing machine after execution of the second sequence group is completed, wherein the plurality of sequences is a functional safety communication initialization sequence executed between the slave device and one of the control device and the standby device prior to operations in which said one of the control device and the standby device controls the slave device.

11. A non-transitory computer readable medium storing a computer executable standby program for a standby device to replace a control device when a failure occurs in the control device to control a computing machine, the standby program causing the standby device being a computer to execute:

a first preparation process of executing, when a preparation sequence group including a plurality of sequences, to be executed before starting control communication for controlling the computing machine, is started between the computing machine and the control device, a first sequence group consisting of one or some of the plurality of sequences included in the preparation sequence group together with the computing machine, by a first preparation part;

a second preparation process of executing a second sequence group being a sequence of the preparation sequence group other than the first sequence group together with the computing machine when a failure of the control device is detected after execution of the first sequence group is completed by the first preparation process, by a second preparation part; and a standby-side communication process of starting the control communication with the computing machine after execution of the second sequence group is completed by the second preparation process, by a standby-side communication part, wherein the plurality of sequences is a functional safety communication initialization sequence executed between the slave device and one of the control device and the standby device prior to operations in which said one of the control device and the standby device controls the slave device.

\* \* \* \* \*